(12) United States Patent
Hess

(10) Patent No.: US 9,468,935 B2
(45) Date of Patent: Oct. 18, 2016

(54) SYSTEM FOR FILTERING AIRBORNE PARTICLES

(71) Applicant: Donald H. Hess, Dunedin, FL (US)

(72) Inventor: Donald H. Hess, Dunedin, FL (US)

( * ) Notice: Subject to any disclaimer, the term of this patent is extended or adjusted under 35 U.S.C. 154(b) by 125 days.

(21) Appl. No.: 14/016,896

(22) Filed: Sep. 3, 2013

(65) Prior Publication Data

US 2014/0076163 A1    Mar. 20, 2014

Related U.S. Application Data

(60) Provisional application No. 61/695,588, filed on Aug. 31, 2012.

(51) Int. Cl.

| | |
|---|---|
| *B01D 46/00* | (2006.01) |
| *B03C 3/41* | (2006.01) |
| *B03C 3/017* | (2006.01) |
| *B03C 3/09* | (2006.01) |
| *B03C 3/12* | (2006.01) |
| *B03C 3/155* | (2006.01) |
| *B03C 3/47* | (2006.01) |
| *F24F 3/16* | (2006.01) |
| *B01D 53/32* | (2006.01) |

(52) U.S. Cl.
CPC ............... *B03C 3/41* (2013.01); *B01D 53/323* (2013.01); *B03C 3/017* (2013.01); *B03C 3/0175* (2013.01); *B03C 3/09* (2013.01); *B03C 3/12* (2013.01); *B03C 3/155* (2013.01); *B03C 3/47* (2013.01); *F24F 3/166* (2013.01); *B01D 2257/90* (2013.01); *B01D 2257/91* (2013.01); *B01D 2259/4508* (2013.01); *B03C 2201/04* (2013.01); *B03C 2201/10* (2013.01); *F24F 2003/1682* (2013.01)

(58) Field of Classification Search
CPC .......... B01D 2257/90–2257/91; B01D 55/323
USPC ......... 96/3, 19, 66, 70, 76, 97–98; 95/70, 75
See application file for complete search history.

(56) References Cited

U.S. PATENT DOCUMENTS

| | | |
|---|---|---|
| 1,357,466 A | 11/1920 | Moller |
| 2,906,369 A | 9/1959 | Lagarias |
| 3,984,215 A | 10/1976 | Zucker |
| 3,985,524 A | 10/1976 | Masuda |
| 4,056,372 A | 11/1977 | Hayashi |

(Continued)

FOREIGN PATENT DOCUMENTS

| | | |
|---|---|---|
| EP | 0646416 A | 4/1995 |
| JP | S5233173 A | 3/1977 |

(Continued)

*Primary Examiner* — Jason M Greene
*Assistant Examiner* — Karla Hawkins
(74) *Attorney, Agent, or Firm* — GrayRobinson, P.A.; Michael J. Colitz, III

(57) ABSTRACT

Disclosed is a system for filtering airborne particles from an occupied space. The system permits the removal of airborne particles by manipulating both the charge and the size of the particles, thus enabling the capture of particles that most other typical filtration systems leave behind. More specifically, the system captures small airborne particles through the use of a series of electric fields, forcing them to be trapped in a series of filters or collide to form larger particles, whereby their movement and capture are subsequently governed primarily by airflow. The system controls particle behavior by utilizing specific electromagnetic fields to collide particles, capture particles, and deactivate live pathogens that get captured.

34 Claims, 18 Drawing Sheets

(56) References Cited

U.S. PATENT DOCUMENTS

| | | |
|---|---|---|
| 4,094,653 A | 6/1978 | Masuda |
| 4,170,447 A | 10/1979 | Goldstein et al. |
| 4,209,306 A | 6/1980 | Feldman et al. |
| 4,265,641 A | 5/1981 | Natarajan |
| 4,357,150 A | 11/1982 | Masuda et al. |
| 4,496,375 A | 1/1985 | Le Vantine |
| 4,690,694 A | 9/1987 | Alig et al. |
| 4,734,105 A | 3/1988 | Eliasson et al. |
| 4,781,736 A | 11/1988 | Cheney et al. |
| 4,822,381 A | 4/1989 | Mosley et al. |
| 4,979,364 A | 12/1990 | Fleck |
| 5,061,296 A | 10/1991 | Sengpiel et al. |
| 5,199,257 A | 4/1993 | Colletta et al. |
| 5,255,178 A | 10/1993 | Liberati |
| 5,282,891 A | 2/1994 | Durham |
| 5,401,299 A | 3/1995 | Kroeger et al. |
| 5,403,383 A | 4/1995 | Jaisinghani |
| 5,542,964 A | 8/1996 | Kroeger et al. |
| 5,547,493 A | 8/1996 | Krigmont |
| 5,547,496 A | 8/1996 | Hara |
| 5,647,890 A | 7/1997 | Yamamoto |
| 5,695,549 A | 12/1997 | Feldman et al. |
| 5,707,422 A | 1/1998 | Jacobsson et al. |
| 5,707,428 A | 1/1998 | Feldman et al. |
| 5,711,788 A | 1/1998 | Kim et al. |
| 5,733,360 A | 3/1998 | Feldman et al. |
| 5,787,704 A | 8/1998 | Cravero |
| 6,004,376 A | 12/1999 | Frank |
| 6,162,285 A | 12/2000 | Fong et al. |
| 6,245,299 B1 | 6/2001 | Shiloh et al. |
| 6,375,714 B1 | 4/2002 | Rump et al. |
| 6,611,440 B1 | 8/2003 | Johnston et al. |
| 6,713,026 B2 | 3/2004 | Taylor et al. |
| 6,773,489 B2 * | 8/2004 | Dunn .................. 95/78 |
| 6,790,259 B2 | 9/2004 | Rittri et al. |
| 6,872,238 B1 | 3/2005 | Truce |
| 6,878,192 B2 | 4/2005 | Pasic |
| 6,989,049 B2 | 1/2006 | Belson et al. |
| 7,175,695 B1 | 2/2007 | Hess |
| 7,261,765 B2 | 8/2007 | Katayama |
| 7,404,847 B2 | 7/2008 | Hess |
| 7,803,213 B2 | 9/2010 | Hess |
| 2001/0025570 A1 | 10/2001 | Fukushima |
| 2004/0159232 A1 | 8/2004 | Mohamed |
| 2007/0022876 A1 | 2/2007 | Hess |
| 2007/0137479 A1 * | 6/2007 | Hess .................. 95/70 |

FOREIGN PATENT DOCUMENTS

| | | |
|---|---|---|
| JP | S5245781 A | 4/1977 |
| JP | H07246347 A | 9/1995 |
| JP | H11156237 A | 6/1999 |
| JP | 2001334172 A | 12/2001 |
| JP | 2003103196 A | 4/2003 |

* cited by examiner

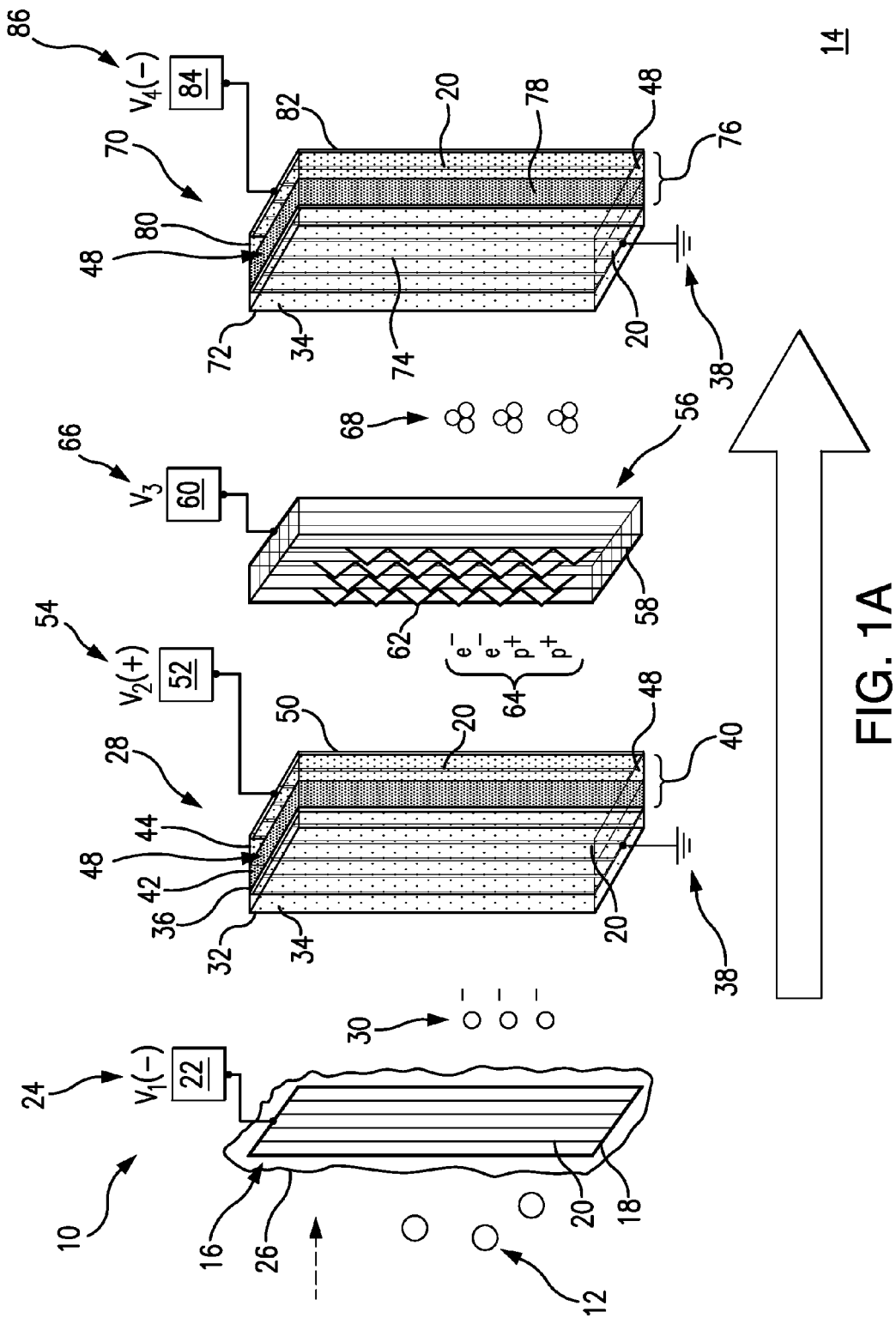

SYSTEM FOR FILTERING AIRBORNE PARTICLES

RELATED APPLICATION DATA

This application claims priority to co-pending application Ser. No. 61,695/588 filed on Aug. 31, 2012 and entitled "Advanced Filtration System for Airborne Particles." The contents of this application are fully incorporated herein for all purposes.

TECHNICAL FIELD

This disclosure relates to a system for the filtration of airborne particles from an occupied space. More particularly, this disclosure relates to the filtration of small airborne particles from an occupied space by manipulating the charge and size of airborne particles and capturing them in a series of filters.

BACKGROUND OF THE INVENTION

Airborne particles exist in a wide variety of shapes and sizes. Aerosols are composed of either solid or liquid particles. Conversely, gases are molecules that are neither liquid nor solid and expand indefinitely to fill the surrounding space. Both types of contaminates exist at the micron and sub-micron level in air. Most dust particles, for example, are between 5-10 microns in size (a micron is approximately 1/25,400th of an inch). Other airborne contaminates can be much smaller. Bacteria commonly range anywhere between 0.3 to 2 microns in size, and viruses can be as small as 0.02 microns in size or smaller. The importance of removing these contaminates varies based upon the application. Semiconductor clean rooms and hospital operating rooms are two examples of spaces where the ability to remove contaminates is critical.

One factor complicating the removal of contaminates is that particle number density increases with smaller particle size. For example, in the typical cubic foot of outside air there are approximately 1000 10-30 micron sized particles. The same volume of air, however, contains well over one million 0.5 to 1.0 micron particles. As particle measuring instrumentation evolve they are capable of measuring deeper into the submicron range. Thus, advances in particle detection technology has confirmed that a great majority of all airborne particles are less than a micron in size. The prevalence of small particles is problematic from an air quality standpoint because small particles are hard to control and therefore hard to capture. Yet most contamination problems are caused by small particles.

Most small particles have a charge associated with them, while larger particles tend to be more neutral in charge. Thus, the movement of small airborne particles is primarily governed by electromagnetic forces, whereas the movement of large airborne particles is primarily governed by airflow. Further, small particles are also more influenced by Brownian Motion, both thermal and kinetic. However, larger particles have more mass associated with them. This is the basis of why larger particles are controlled more by the airflow generated by an HVAC system.

Particles acquire charge by three basic mechanisms. Diffusion charging occurs when particles are charged by random collisions between ions and other particles. The motion and collisions result from a process known as Brownian motion. The particle can take on multiple charges by this mechanism. Field charging occurs when rapid ion movement in an electric field causes frequent collisions between ions and particles. Finally, static electrification occurs when particles are separated from surfaces, thereby charging the particles. The factors that affect how a particle behaves in an electric field include particle size, the charge associated with the particle, and the strength of the electromagnetic field. The smaller the particle, the more it is influenced by an electromagnetic field. The more charge there is on a particle, the stronger the influence of the electromagnetic field. The stronger the electric field, of course, the more influence it has on the particle.

As discussed above, a great majority of the airborne particles found in nature are less than a micron in size. Thus, conventional air filtration systems that utilize airflow to capture airborne particles by trapping them in a filter device inevitably fail to trap smaller particles, leaving them free to circulate within an occupied space. Furthermore, the more efficient the filter in a system governed by airflow, the greater the pressure drop across the system. This pressure drop consequently decreases the efficiency of air filtration systems dependent on airflow as the primary force on airborne particles.

To overcome the difficulties associated with the capture of small particles, different particle conditioning techniques can be orchestrated together to control the transport, capture, and deactivation of particles. These conditioning tools include but are not limited to, particle ionization, particle polarization, and controlled particle colliding.

Particle Ionization—

Particle ionization occurs when a particle passes through an ion field. One type of ion field is a corona field. A corona field is created when a voltage is passed through a very thin wire or a thin metal blade with a serrated edge. Upon application of the voltage, electric fields concentrate on a sharp point and on a thin edge. When the electric field is strong enough, charges are emitted to the surrounding space, thereby developing a space charge. For example, if a negative high voltage is applied to a thin wire or metal edge, electrons are emitted to the air surrounding the wire or blade. When a particle passes through this created electron field, the particle picks up, or acquires, some of the electrons and becomes a negative ion (this also applies to a positive field which produces a positive ion). In the case of a particle passing through the negative ion field (electrons) the particle becomes negatively charged, thereby allowing it's movement to be controlled by the subsequent application of another electric field. If a grid that has the same voltage applied to it as the corona grid is placed in the path of the particle, the particle will be repelled by the grid (like charges repel each other). Furthermore, if a positive wire is placed downstream from the negative wire the conditioned particle will be propelled towards this positive grid (unlike charges attract each other). This is how the trajectory of particles can be controlled using precisely controlled electromagnetic, electrostatic, and/or electrodynamic fields.

Particle Polarization—

When a particle passes through a strong electrostatic field it can form a dipole, wherein one end of the particle is positively charged and the other end is negatively charged. This polarization is due to the fact that opposite charges attract and like charges repel. When a particle approaches a strong electrostatic field, such as a −15 kV field, a dipole is formed. Some of the positive charges in the particle will move toward the strong field (front of the particle) and some of the negative charges will move towards the opposite end (rear) of the particle, away from the static field (FIG. 2A). Once this occurs the particle passes through the electrostatic field. If a second electrostatic field, of the opposite potential is downstream from the first electrostatic field the particle propels toward it.

Controlled Particle Colliding—

Controlled Particle Colliding performs at least two functions. First, it causes collisions between sub-micron sized particles to form larger particles, thus changing them from being dominantly controlled by electromagnetic fields to being controlled by airflow. Second, it makes particles neutral in charge. Particles will not only stay entrained in the airflow without being influenced by the electromagnetic fields in the room environment, but will not be as likely to form strong bonds with surfaces and objects in the room, even if they should come in contact with them.

Media Filter Systems—

This major class of filter system typically uses no electromagnetics in its operation. Basically this type of air cleaning device is a particle block. The particles that get to the device are filtered in the media material. In other words filtration occurs at the filter. These devices are placed in the airstream perpendicular to airflow. Airflow brings the incoming particles to the filter and the incoming particles get trapped as the air passes through the filter. This type of device depends on airflow.

Collector Systems—

When proper dielectric media material is utilized and an electrostatic field is applied across the media material, an opposite polarizing electric field is generated across the media material causing the material itself to polarize (see FIGS. 4 and 5). Depending on the density of the media material determines the depth of penetration of conditioned particles. Optimizing the Collector and proper conditioning of particles results in efficient particle collection (and deactivation of microbes where appropriate).

Transport Mechanisms are what control the movement of particles. In every building environment there are forces present that determine these transport mechanisms. The Dominant Transport Mechanisms in a building environment are Airflow and/or Electromagnetic Fields, as described herein. Only relatively large particles, greater than a micron in size, are controlled by airflow. Smaller particles are dominantly controlled by electromagnetic fields. The smaller the particle, the more this statement becomes true.

Two equations dictate particle behavior. 1. Force equals the change in momentum of the particle (F=ma), due to airflow. 2. Charge times the electric field E (F=qE) due to electric forces in the room environment. Note 1: F is the force, m is the mass, a is acceleration, and E is the electric field. The first equation (F=ma) describes how airflow controls particle behavior and the second equation (F=qE) describes how the electric field controls particle behavior.

As is known in the art, the difficulty associated with capturing small airborne particles can be overcome by utilizing Particle Accelerated Collision Technology™ (PACT) (U.S. Pat. No. 7,175,695). PACT makes airflow the dominant transport mechanism and controls the behavior of fine particulates by creating inelastic collisions on a sub-micron level. This causes smaller particles to collide inelastically, thus becoming larger, thereby enabling any associated filtration system to easily remove these larger particles from the air. This collision process significantly improves the ability of a standard filtration system to remove and reduce indoor and outdoor generated contaminate levels.

Controlled Particle Colliding is similar to PACT, but much more compact. By combining it with the other components described herein it is made as effective as PACT. Alone, it would not be as effective due to its depth of influence being much smaller than an actual PACT system.

Also known in the art is Particle Guide Technology (PGT) (Pub. No. 2012/0085234). PGT forces particles to travel in a desired manner to a desired location, and/or a Particle Collector. The Particle Collector then traps the particles, removing them from the occupied space. PACT and PGT both utilize controlled electromagnetic fields to guide particles to a desired location. They are employed as a particle control device.

The majority of present filtration devices depend on airflow to guide particles to the filtration system. In general they are particle traps. Further, the space available in a typical HVAC system is limited. When the space that the filter is placed in is limited (in the direction of depth) the efficiency and/or pressure drop of the system can be compromised. Although great strides have been made in the efficiency of the traps, little has been done to control the particle itself. It should be mentioned that different particle conditioning techniques have been utilized individually to enhance particle filtration. However, to combine these effects in an optimized manner to control particle behavior is the goal of the present invention. By conditioning and controlling particles, the present invention takes advantage of the dominant transport mechanisms in air.

SUMMARY OF THE INVENTION

This disclosure provides a system for filtering airborne particles in an occupied space, the system comprising a particle conditioning unit; a first stage collector; and a particle collider. Another embodiment of the present disclosure includes a second stage collector positioned downstream the particle collider. Yet another embodiment of the invention includes a particle deflector system for overcoming the limitations associated with typical air filtration systems based solely on the physical capture of particles guided by airflow.

The disclosed system has several important advantages. For example, the disclosed system functions to make airflow the dominant transport mechanism of airborne particles.

A further possible advantage is that the collector system is more effective and efficient at capturing both small and large airborne particles.

Still yet another possible advantage of the present system is the capture and deactivation of health degrading organisms that interact with the filter system.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 1A is a diagrammatical illustration of an air filtration system comprising a particle conditioning unit, a first stage collector, a particle collider, and a second stage collector.

FIG. 1B is a diagrammatical illustration of an air filtration system comprising a particle conditioning unit, a first stage collector, and a particle collider.

FIG. 2A is a diagrammatical illustration of a particle conditioning unit sufficient for polarizing an airborne particle.

FIG. 2B is a diagrammatical illustration of a particle conditioning unit sufficient for polarizing and ionizing airborne particles.

Similar reference numerals refer to similar parts throughout the several views of the drawings.

PARTS LIST

| | |
|---|---|
| 10 | system |
| 12 | airborne particles |
| 14 | occupied space |
| 16 | particle conditioning unit |
| 18 | first grid |
| 20 | electrically conductive elements |
| 22 | first voltage source |
| 24 | first voltage |
| 26 | corona field |
| 28 | first stage collector |
| 30 | ionized airborne particles |

-continued

PARTS LIST

Figure 2A:
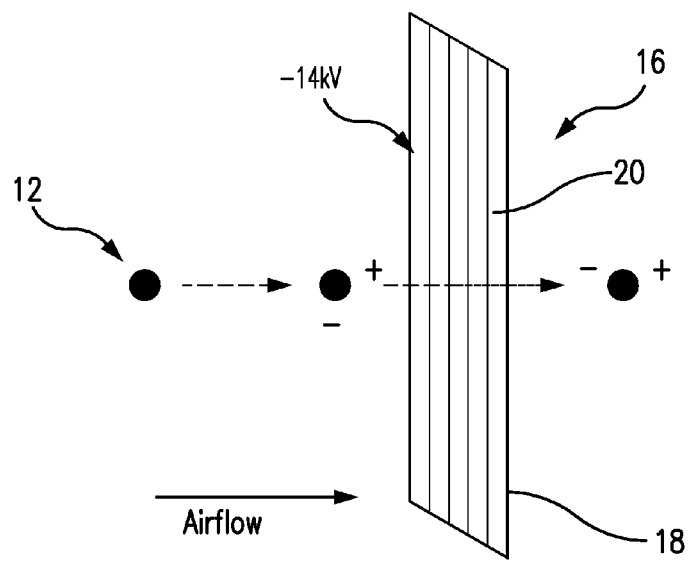
Figure 2B:
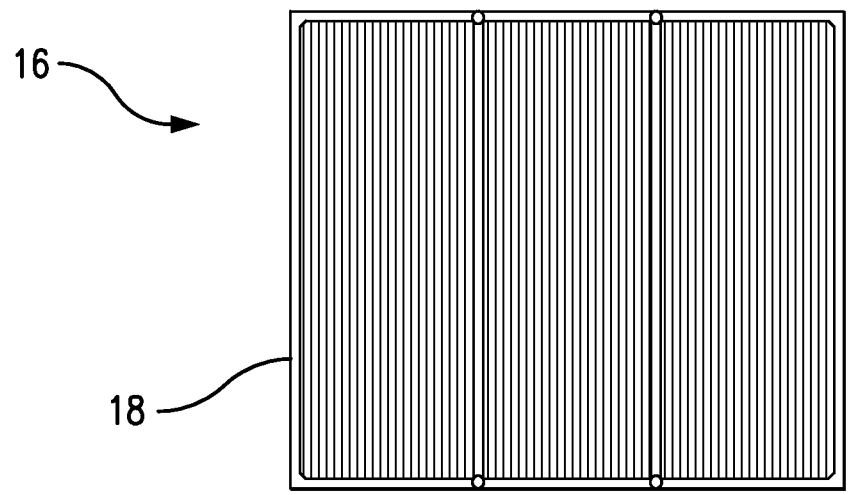

| | |
|---|---|
| 31 | polarized airborne particles |
| 32 | first particle diffuser |
| 34 | dielectric fibers |
| 36 | second grid |
| 37 | first supplemental voltage source |
| 38 | grounded |
| 39 | first supplemental voltage |
| 40 | first collector pad assembly |
| 42 | first filter pad |
| 44 | second filter pad |
| 46 | fibers |
| 48 | dielectric material |
| 50 | third grid |
| 52 | second voltage source |
| 54 | second voltage |
| 56 | particle collider |
| 58 | plurality of parallel serrated blades |
| 59 | wire array |
| 60 | third voltage source |
| 61 | plurality of solid blades |
| 62 | points |
| 64 | ionizing particles |
| 66 | third voltage |
| 68 | larger particles |
| 70 | second stage collector |
| 72 | second particle diffuser |
| 73 | second supplemental voltage source |
| 74 | fourth grid |
| 75 | second supplemental voltage |
| 76 | second collector pad assembly |
| 78 | third filter pad |
| 80 | fourth filter pad |
| 82 | fifth grid |
| 84 | fourth voltage source |
| 86 | fourth voltage |
| 88 | particle deflector |
| 90 | fifth voltage source |
| 92 | fifth voltage |

DETAILED DESCRIPTION OF THE EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

The present invention relates to systems and related methods for the filtration of airborne particles in an occupied space. The various components of the present invention, and the manner in which they interrelate, are described in greater detail hereinafter.

By way of example and with reference initially to FIGS. 1A, 1B, 2A, and 2B, one embodiment of the invention comprises a system 10 for filtering airborne particles 12 in an occupied space 14, the system 10 comprising a particle conditioning unit 16 including a first grid 18 of electrically conductive elements 20 and a first voltage source 22, wherein a first voltage 24 is applied to the first grid 18 by the first voltage source 22 sufficient for creating a corona field 26 for ionizing airborne particles 12 received by the particle conditioning unit 16. The particle conditioning unit 16 may include wires of different diameters or blades of different serrations and thickness depending on how much polarization or ionization of incoming particles 12 is desired to optimize collection in the first and second stage collectors 28, 70 downstream in the system 10. The larger diameter (thicker) wires polarize incoming particles forming particle dipoles. As an example, applying a negative potential on the particle conditioning unit 16 creates dipoles as shown in FIG. 2A. The voltage field polarity of the particle conditioning unit determines the dipole structure. The grid wires 18 in FIG. 2A are of large diameter and therefore does not set up a corona field 26 and does not emit negative ions. As a result, the incoming particles are polarized as shown. Once the dipole is formed the particle 31 moves to the first stage collector 28. It should be understood that depending on the strand type and thickness of each wire employed in the particle conditioning unit 16, the grid wires could also be used as an ionizer. Further, the particle conditioning unit 16 can perform both operations simultaneously or independently depending on the wire stranding (or blade thickness configuration) of the particle conditioning unit 16 (see FIG. 2B). In this way incoming particles 12 can be conditioned for optimum collection in the first stage collector 28 and the second stage collector 70. Therefore, both negative ions and or dipoles can be created by the first grid 18 of the particle conditioning unit 16.

Figure 1B:
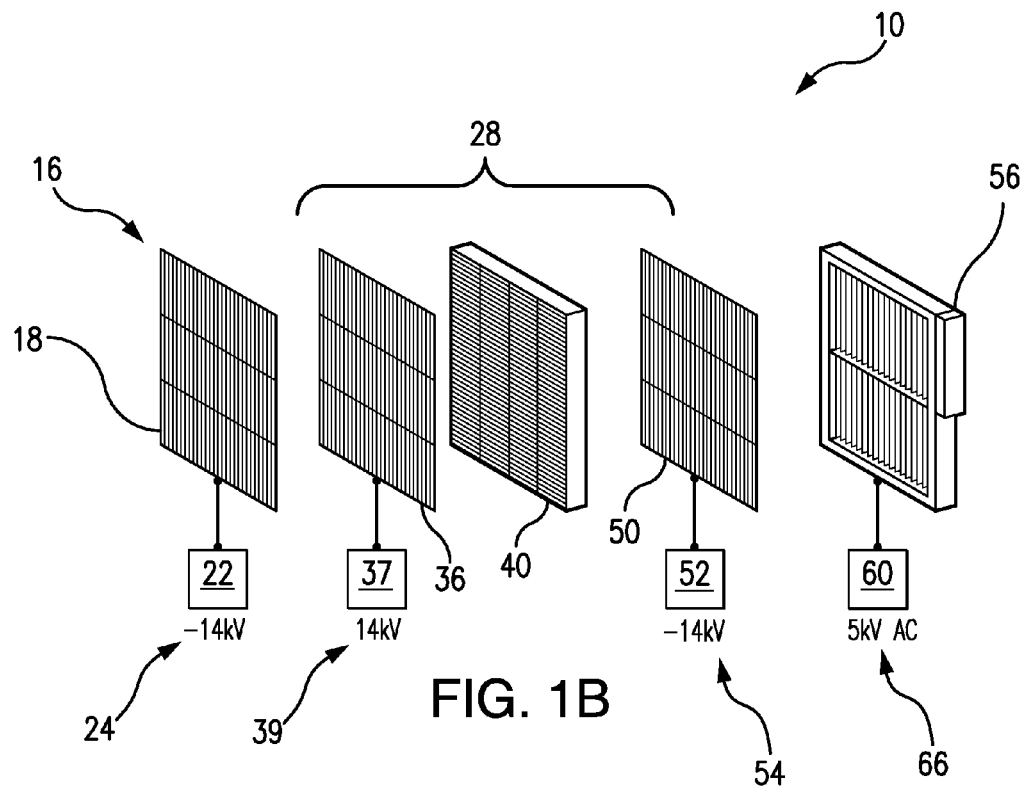
Figure 3A:
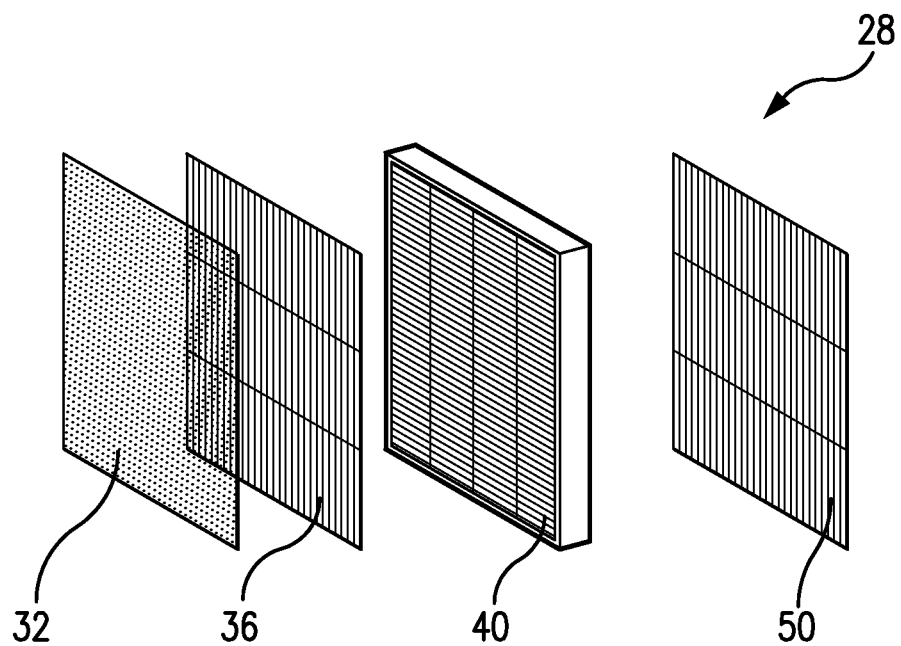
FIG. 3A is a diagrammatical illustration of a first stage collector.
Figure 3B:
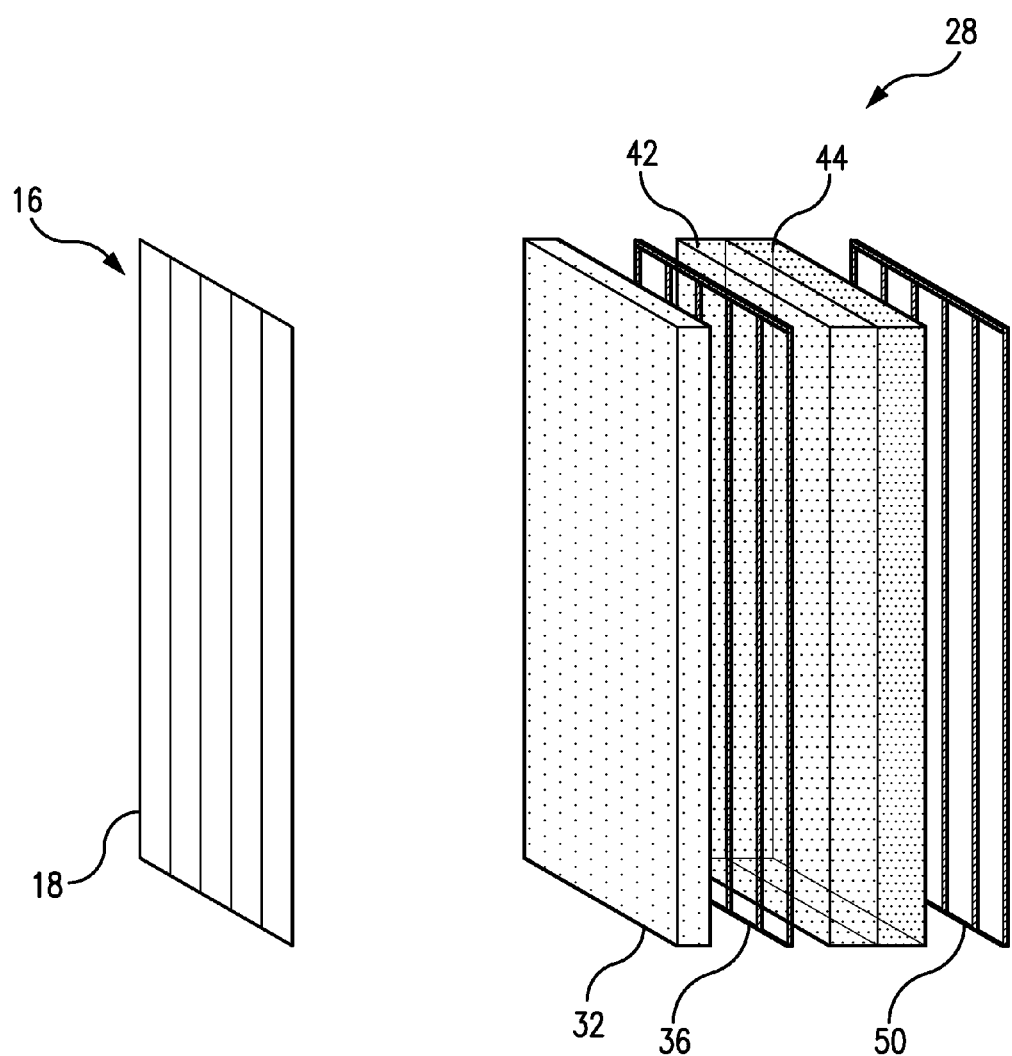
FIG. 3B is a diagrammatical illustration of a particle conditioning unit and a first stage collector.
Figure 4A:
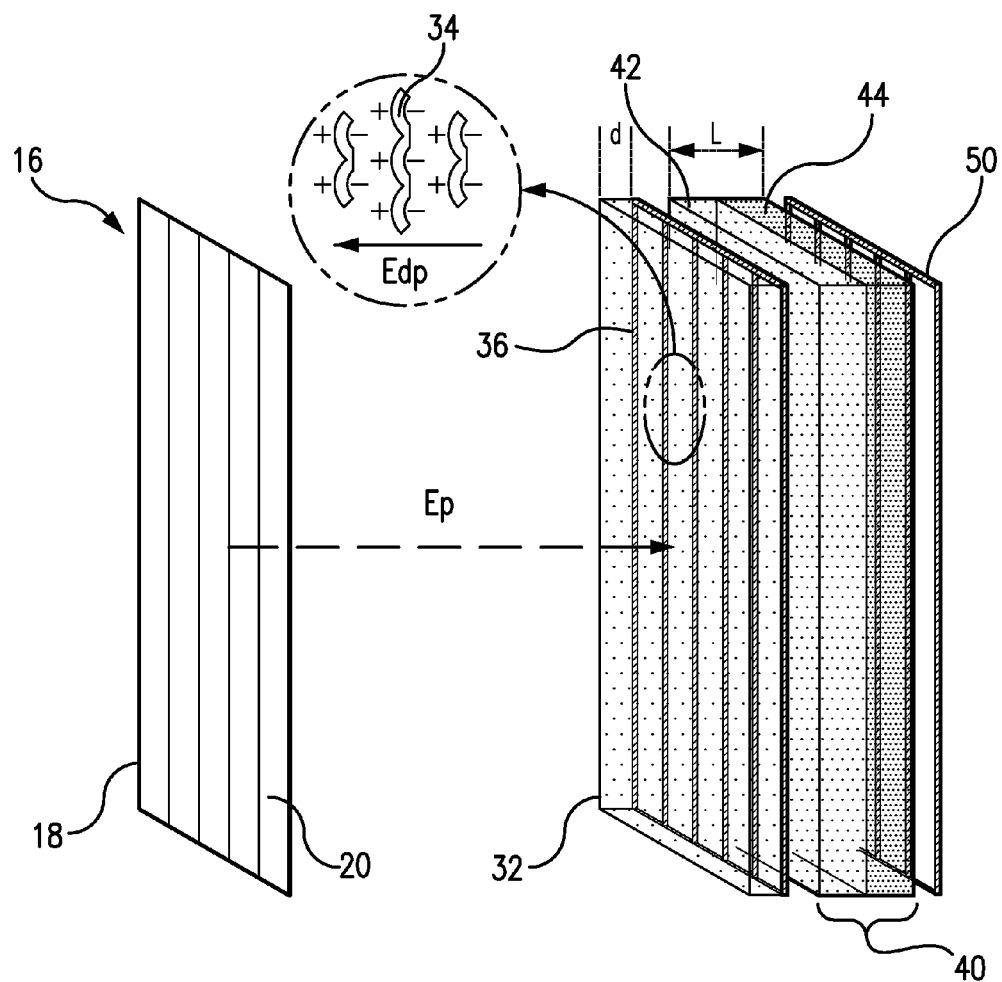
FIG. 4A is a diagrammatical illustration of an electric field between a particle conditioning unit and a first stage collector.
Figure 4B:
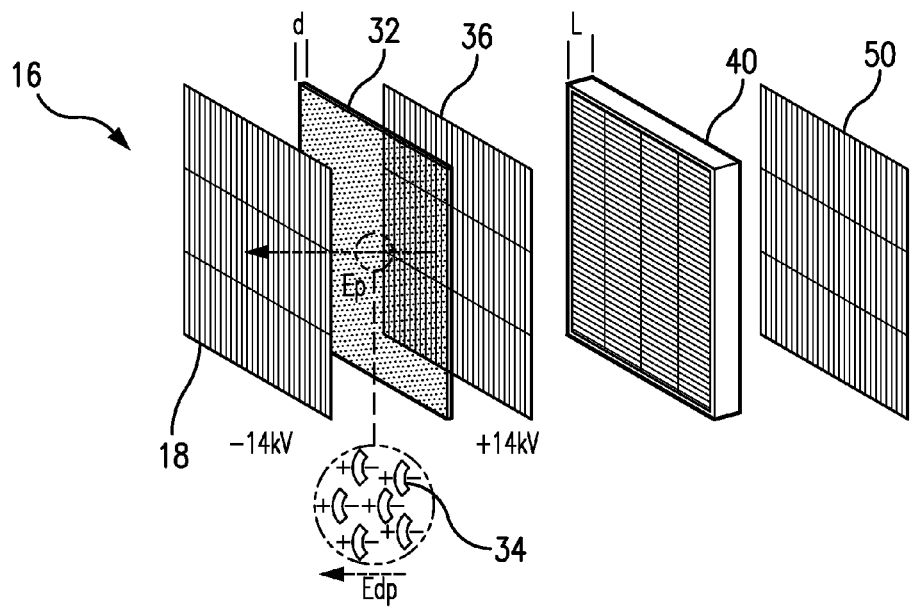
FIG. 4B is another diagrammatical illustration of an electric field between a particle conditioning unit and a first stage collector.
Figure 5A:
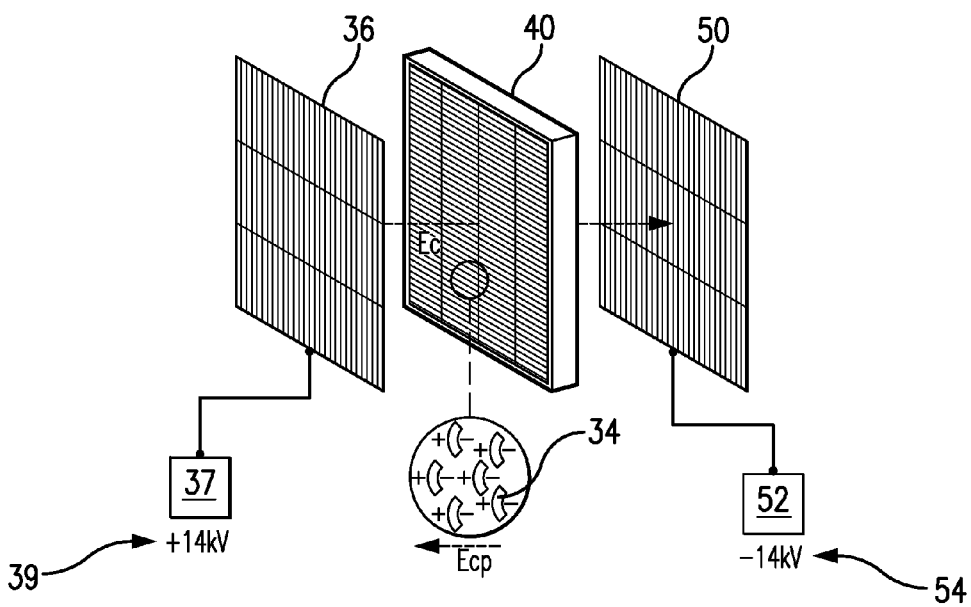
FIG. 5A is a diagrammatical illustration of an electric field within a first stage collector.
Figure 5B:
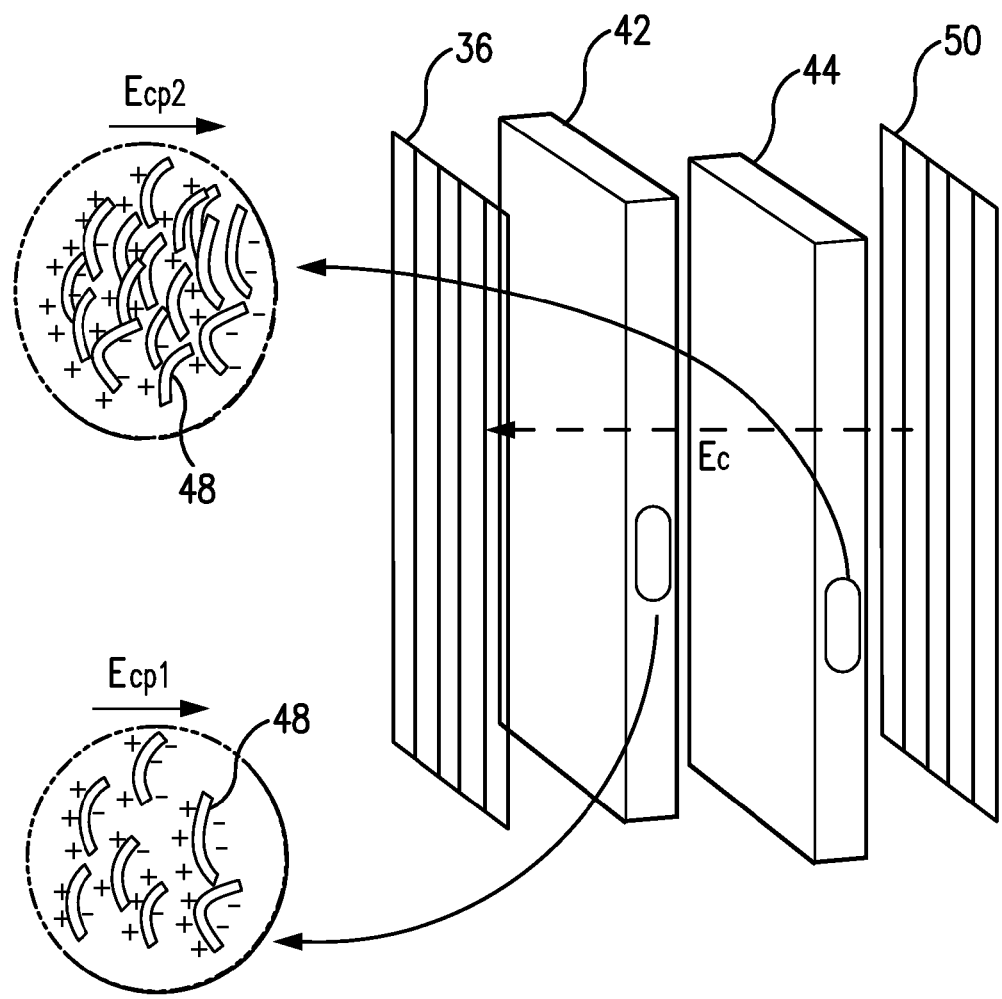
FIG. 5B is a diagrammatical illustration of multiple electric fields within a first stage collector.
Figure 6A:
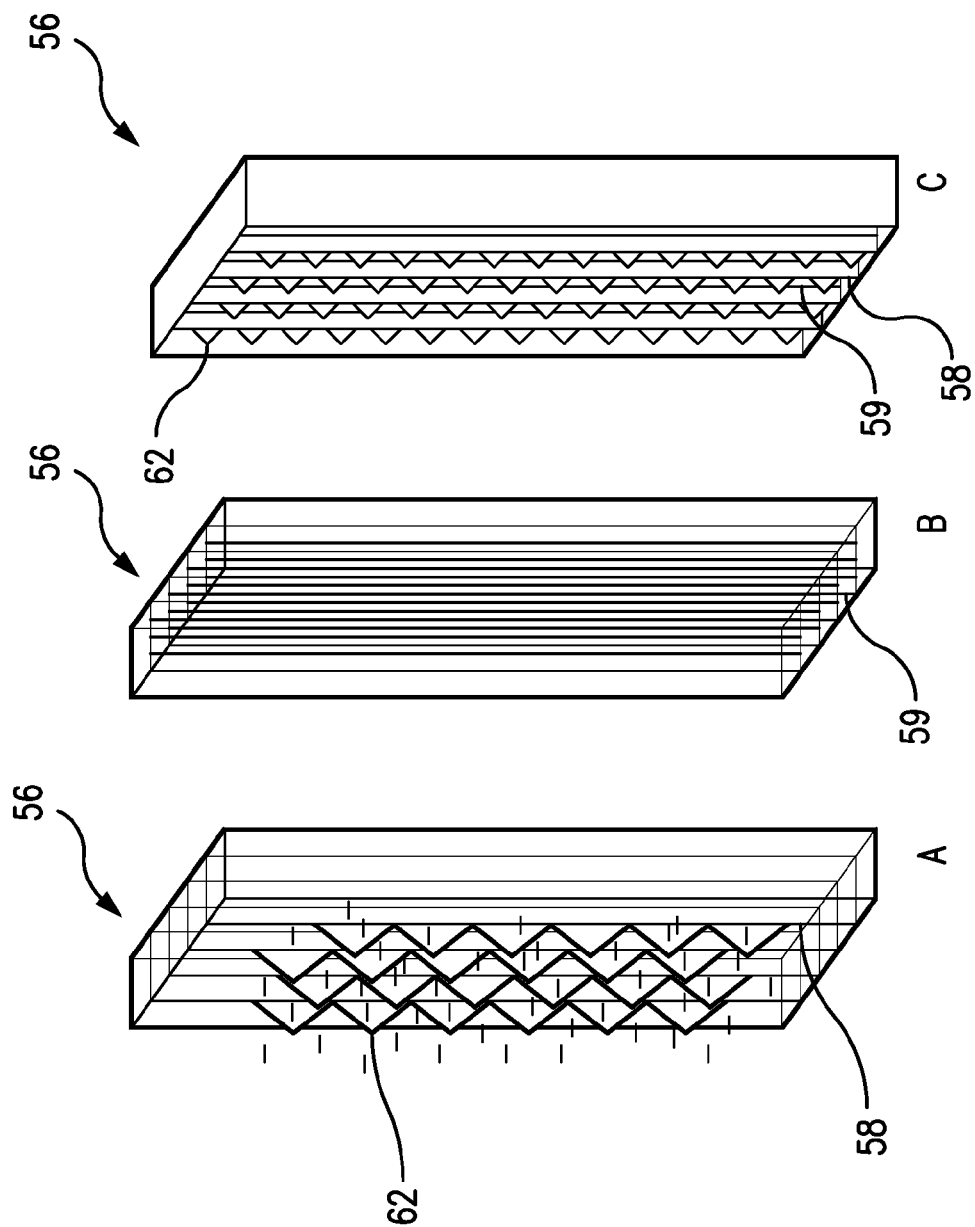
FIG. 6A is a diagrammatical illustration of different embodiments of a particle collider.
Figure 6B:
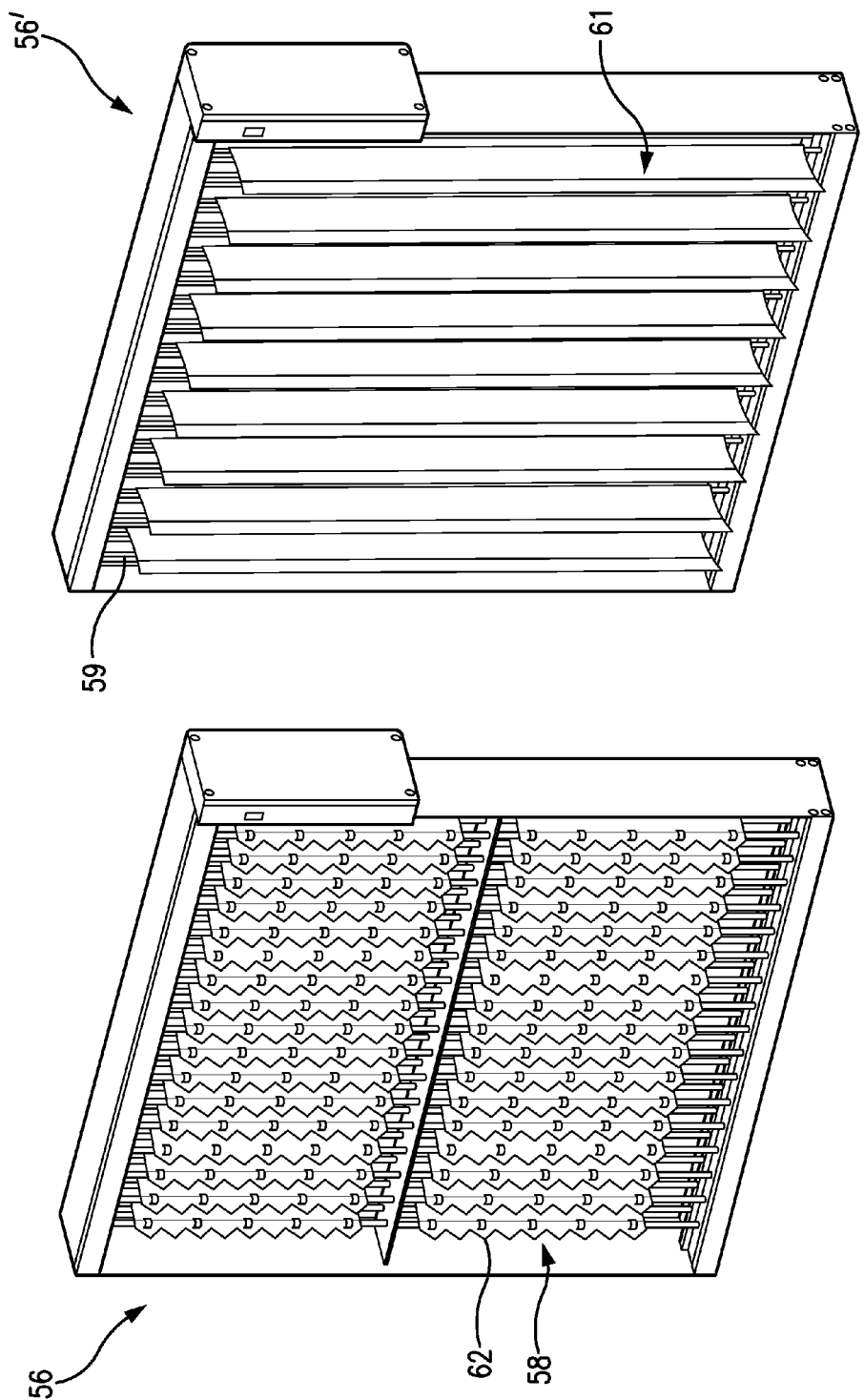
FIG. 6B is another diagrammatical illustration of different embodiments of a particle collider.

With reference to FIGS. 1A, 1B, and 3A, one embodiment of the invention comprises a first stage collector 28 positioned downstream the particle conditioning unit 16 for receiving the ionized airborne particles 30, the first stage collector 28 including a first particle diffuser 32 including dielectric fibers 34; a second grid 36 positioned downstream the first particle diffuser 32, the second grid 36 including electrically conductive elements 20, wherein the second grid is electrically grounded 38; a first collector pad assembly 40 positioned downstream the second grid 36, the first collector pad assembly 40 including a first filter pad 42 and a second filter pad 44, wherein the first and second filter pads 42, 44 comprise fibers 46 of dielectric material 48, and wherein the first filter pad 42 is less dense than the second filter pad 44; and a third grid 50 positioned downstream the first collector pad assembly 40, the third grid 50 including electrically conductive elements 20 and a second voltage source 52, wherein a second voltage 54 is applied to the third grid 50 by the second voltage source 52, and wherein the second voltage is of opposite polarity to the first voltage 24.

The second grid 36 of the first stage collector 28 can be grounded 38 or set at the opposite potential of the first grid 18 of the particle conditioning unit 16. The object is to control the trajectory of the conditioned particles 30, 31 as they exit the particle conditioning unit 16 and optimize the collection of these particles. It should be noted that the type of particle least affected by the first stage collector 28 is a neutral (no charge associated with it) particle. In summary, the one objective is to optimize the stranding of the particle conditioning unit 16 so that particles are optimally charged, by creating dipoles 31 and/or ions 30, and then capturing the conditioned particles 30, 31 in the first stage collector 28.

The first grid 18 of the particle conditioning unit 16 also sets up an electrostatic field, Ep, between itself and the second grid 36 of the first stage collector 28. The second grid 36 of the first stage collector 28 may be grounded 38 or set at the opposite potential of the first grid 18 of the particle conditioning unit 16. This becomes important for proper operation of the first particle diffuser 32 in the first stage collector 28, which will be explained below.

The first stage collector 28 may be divided into five parts, including a first particle diffuser 32, a second grid 36, a first collector pad assembly 40 including first and second filter pads 42, 44, and a third grid 50.

The First Particle Diffuser 32—

Conditioned particles 30, 31 penetrate the first particle diffuser 32 pad first. This first particle diffuser 32 pad is placed in front of the second grid 36 of the first stage collector 28. The first particle diffuser 32 distributes the incoming conditioned particles 30, 31 so they do not coat the second grid 36 of the first stage collector 28. The first particle diffuser 32 forces particles to be diffused away from the second grid 36 of the first stage collector 28, thus protecting the grid from coating with particles, which would diminish the operation of the system. This significantly extends the period between maintenance of the system. The first particle diffuser 32 pad has a thickness d, which is much thinner than the first collector pad assembly 40 of thickness L. In this way the majority of particles penetrate to the first and second filter pads 42, 44. FIG. 4 shows the electric field, Ep, created between the particle conditioning unit 16 and the second grid 36 of the first stage collector 28. This field penetrates the first particle diffuser 32, thereby polarizing the dielectric media fibers 34 in the first particle diffuser 32. The polarized field created in the first particle diffuser 32 pad media material is an electric (E) field in the opposite direction, Edp (see FIG. 4). It should be noted that a first particle diffuser 32 pad may or may not be employed. This does not change the scope of the invention.

Second Grid 36 of the First Stage Collector 28—

The second grid 36 is grounded 38 or at the opposite potential of the particle conditioning unit 16 as explained above and completes the potential difference between them (Ep). Again, Ep causes the dielectric fibers 34 in the first particle diffuser 32 to polarize creating Edp throughout the first particle diffuser 32 material. The second grid 36 also sets up an E field to the third grid 50 of the first stage collector 28, which is at the opposite potential to the second grid 36. The generated field Ec penetrates the first collector pad assembly 40.

The First Collector Pad Assembly 40—

The first collector pad assembly 40 may include two pad components, a first filter pad 42 (open weave pad) and a second filter pad 44 (closed weave pad). The two pads are composed of dielectric impregnated fibers 46, or dielectric material 48, that are polarized by the Ec field. The open weave structure in the first filter pad 42 attracts some of the incoming particles 30, 31 and allows other particles to penetrate deeper into the second filter pad 44 for proper distribution and a larger surface area, and as a result, longer filter life. The velocity and charge associated with the conditioned incoming particles 30, 31 determine the penetration depth of these particles. In a manner similar to that described for the first particle diffuser 32, the field Ec polarizes the media in the first collector pad assembly 40 and creates an opposite field in the media Ecp1 and Ecp2.

Third Grid 50 of the First Stage Collector 28—

The third grid 50 of the first stage collector 28 is necessary to complete the potential difference across the first and second filter pads 42, 44. The second and third grids 36, 50 create the electric field Ec across the dielectric material 48 in the first and second filter pads 42, 44, as explained above, thus polarizing the dielectric material 48 in the first and second filter pads 42, 44, creating field Ecp1 and Ecp2 shown in FIGS. 5A and 5B. When the particle dipoles 31 penetrate the first filter pad 42 they are attracted to the fibers 46 and form an ionic bond with the fibers 46 of the first filter pad 42. In one embodiment of the invention, the material in the first filter pad 42 is less dense than the material in the second filter pad 44, allowing particles to penetrate deeply into the first collector pad assembly 40 and into the second filter pad 44. This allows for uniform penetration and long filter life. It will be noticed that Ecp1 and Ecp2 have the opposite field direction as Edp. This optimizes the electrostatic field in the first collector pad assembly 40 for efficient collecting and deactivating of particles.

It should be apparent to one skilled in the art that the system 10 described kills, disables, an/or deactivates pathogens or organisms, including viruses and bacteria. This anti-pathogenic activity of the system 10 results from the ionization and/or polarization fields established by the system 10. In one embodiment of the invention, the anti-pathogenic activity of the system results from the ionization and/or polarization fields established by at least one of the particle conditioning unit 16, the particle collider 56, and the first and second stage collectors 28, 70. Thus, one possible advantage of the present system is the capture and deactivation of health degrading organisms that interact with the filter system.

With reference to FIGS. 1A, 1B, 6A, and 6B, one embodiment of the invention comprises a particle collider 56 positioned downstream the first stage collector 28, the particle collider 56 including a plurality of parallel serrated blades 58 and a third voltage source 60, the plurality of parallel serrated blades 58 comprising points 62 sufficient for emitting ionizing particles 64, wherein a third voltage 66 is applied to the plurality of parallel serrated blades 58 by the third voltage source 60, and wherein the third voltage continuously alternates in polarity, the third voltage sufficient for creating a switching electrodynamic field for forcing the airborne particles 12 to collide with one another, thereby forming larger particles 68.

The particle collider 56 conditions and forces particles to inelastically collide with each other, thereby creating larger particles 68. In one embodiment of the invention, the particle collider 56 consists of emitter plates spaced equally apart 58, 61 or a wire array 59 system. Each plate or wire array has an alternating electric voltage 66 applied to it. The plates alternate at switching time T. If emitters are utilized, they preferably have sharp points 62 that emit ions (in the form of protons and electrons, depending on polarity) into the space in front of each emitter creating a space charge. Since each emitter has the opposite charge associated with it, incoming particles pick up the charge in the region it passes through. This section of the particle collider 56 is the particle conditioning section. Therefore, as particles moves into the particle collider 56, they pass through the appropriate ion field set up by the emitter. The emitters emit equal amounts of positive and negative charges at a high voltage and low enough current not to generate ozone. After the particles pick up their appropriate charge(s) they enter the collision accelerator section of the particle collider 56. The conditioned particles are now conditioned to be influenced by the electric fields set up between the plates of the emitters. As the particles continue to the plate area, after the sharp blades 58, 61, they go back and forth between the plates (as the plates alternate between voltages) and the particles collide with other opposite-charged particles, created by the conditioning section of the particle collider 56, also going back and forth between the plates. Since the emitters voltage alternates particles move back and forth between plates colliding into each other forming larger particles 68. When particles of opposite charge collide they form ionic bonds (inelastic collisions) and do not come apart. The exiting particles are larger than the incoming particles and are more neutral in charge. It should be noted that a wire array system, or combination of wires and plates as well as sharp point emitters, can also be employed. Also, by utilizing thin wires on the third grid 50 of the first stage collector 28 and taking advantage of the ionized particles created by the particle conditioning unit 16 and first stage collector 28, plates or blades 61 alone can be used in the particle collider 56 to collide particles independent of conditioning serrated blades and/or wires.

To summarize, the particle collider 56 performs two operations, particle conditioning and particle colliding. Once the particle enters the electric field, this field becomes the dominant force on the particle. Since each particle has a net charge associated with it, generated by the particle conditioning section of the particle collider 56, it is immediately attracted to the opposite charged plate (emitter). When the field switches the particle is now attracted to the other plate where it is constantly on a collision course with other, oppositely charged particle. Two particles collide and stick together (inelastic collision) making them a larger particle. Then, the larger particle moves towards the opposite charged plate. Again, the electric field of the emitters switch and the larger particle 68 is attracted to the opposite plate. This process continues hundreds of times until the resulting larger particles leave the particle collider 56 with a more neutral charge than the original particles entering the particle collider (see FIG. 6A, 6B).

In another embodiment of the invention, controlled particle colliding is accomplished in two steps, particle conditioning and particle colliding. In the particle conditioning step, particles are conditioned with a small amount of space charge. By putting a charge on particles, they become susceptible to electrodynamic fields. Using thin serrated blades or thin wire arrays the particles entering the particle collider acquire a charge. The particle collider 56 emits equal amounts of positive and negative charges at an extremely low current level to avoid generating ozone. As particles pass through this section of the particle collider they pick up these charges. This makes the particles more influenced by the electrodynamic fields in the particle colliding section of the particle collider that increases their attractive force to each other, thus enhancing inelastic collisions.

In one embodiment of the invention, the particle conditioning step is followed by the particle colliding step. After the particles are conditioned they then enter the switching electrodynamic fields. Particles are accelerated and deflected, thereby enhancing Brownian motion. In this section of the particle collider 56 the collision process is rapidly accelerated and particles interact more rapidly than they would naturally. Both positively charged and negatively charged particles, created by the particle conditioning section of the particle collider 56, go through the switching electrodynamic fields and as a result collide with each other. When they collide they collide inelastically, the applied charges on the particles form ionic bonds with other particles, and larger particles 68 are created. This process of colliding continues throughout the particle colliding section of the particle collider, thereby forming larger and larger particles 68. These particles go into the occupied space 14 and continue the process of colliding with other particles, TVOCs, and gases. Smaller particles, TVOCs and gasses absorb and adsorb onto these larger particles 68, that are now controlled by airflow, and get eliminated from the occupied space 14 because the filtration/collector system is more effective in capturing these particles.

With continued reference to FIG. 1A, one embodiment of the invention comprises a second stage collector 70 positioned downstream the particle collider 56 for receiving the larger particles 68, the second stage collector 70 including a second particle diffuser 72 including dielectric fibers 34; a fourth grid 74 positioned downstream the second particle diffuser 72, the fourth grid 74 including electrically conductive elements 20, wherein the fourth grid is electrically grounded 38; a second collector pad assembly 76 positioned downstream the fourth grid 74, the second collector pad assembly 76 including a third filter pad 78 and a fourth filter pad 80, wherein the third and fourth filter pads 78, 80 comprise fibers 46 of dielectric material 48, and wherein the third filter pad 78 is less dense than the fourth filter pad 80; and a fifth grid 82 positioned downstream the second collector pad assembly 76, the fifth grid 82 including electrically conductive elements 20 and a fourth voltage source 84, wherein a fourth voltage 86 is applied to the fifth grid 82 by the fourth voltage source 84, and wherein the fourth voltage 86 is of a same polarity of the first voltage 24.

Like the first stage collector 28 described above, the second stage collector 70 may include five parts. Further, the first stage collector 28 and the second stage collector 70 may share an identical construction. The second stage collector 70 would be configured to have an opposite field associated with it than the first stage collector 28. The second stage collector 70 attracts remaining charged particles that escaped the other components of the system. Larger neutral particles 68, formed by the particle collider 56 will escape the second stage collector 70 and go out into the occupied space 14 to collect other particles, including but not limited to TVOCs, gases, odors, bacteria, and viruses.

In another embodiment of the present invention and with reference to FIGS. 7A, 7B, 8A, and 8B, the particle conditioning unit 16 is set at a potential of −15 kV. The second grid 36 of the first stage collector 28 is grounded and the third grid 50 is set at a potential of +15 kV. The particle collider 56 utilized is the serrated blade configuration. The second stage collector 70 has the fourth grid 74 grounded and the fifth grid 82 at −15 kV which sets up opposite fields of the first stage collector (see FIG. 7). The wires employed in the particle conditioning unit 16 are small gauge and therefore a negative ion field is generated (see FIG. 8). The first grid is grounded creating an electric field Ep between the particle conditioning unit 16 and the second grid 36 of the first stage collector 28. This field sets up an opposing polarized field Edp in the Diffuser pad that attracts incoming particles and protects the second grid 36 of the first stage collector 28 from coating. The two equations that dictate the penetration of particles into the first stage collector 28 are $F=ma$ and $F=(\Sigma q)E$. $\Sigma q$ represents the sum of the charges on the particle. Three things dictate the penetration of particles into the first stage collector: The incoming velocity of the particle, the amount of charge on the particle after leaving the particle conditioning unit 16, and the mass of the particle. By taking advantage of these properties a large surface area was made out of a relatively small depth of collector material. Particles that escape the first stage collector 28 will enter the Particle Collider 56. As explained above, this section causes particles to inelastically collide with each other forming larger particles. The particles that leave the particle collider are larger and more neutral in charge. The second stage collector 70 collects any remaining charged particles not captured by the first stage collector 28 and that pass through the Particle Collider 56 with a charge associated with it (inefficient collisions). The remaining particles that do escape the second stage collector 70 are conditioned by the Particle Collider 56 to clean out the occupied space 14. Since these conditioned particles are larger in size and more neutral in charge they are controlled by airflow. They will return to the pre-filter and air filtration system 10 (advanced collector system, ACS) to be collected. It is understood by those familiar with the art that other potentials, including the opposite potential or grounding can be applied to the components of the system 10 and still be within the scope of the apparatus.

Figure 9A:
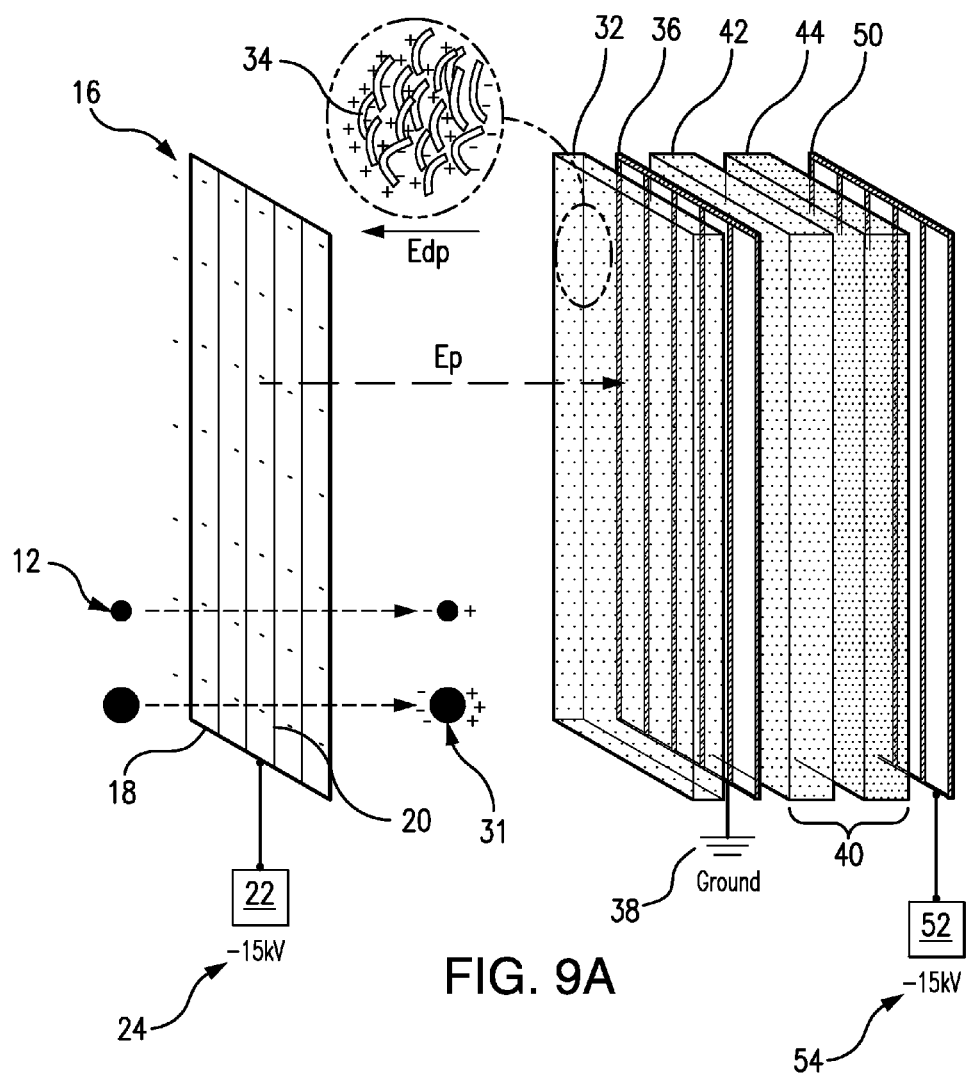
FIG. 9A is a diagrammatical illustration of particle conditioning unit and a first stage collector in which the particle conditioning unit is used as a polarizer.
Figure 9B:
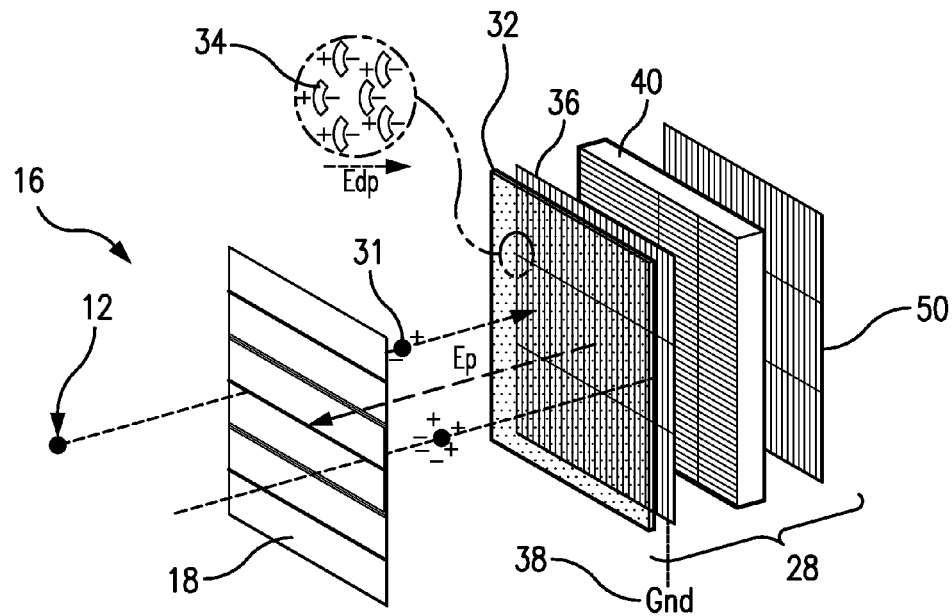
FIG. 9B is another diagrammatical illustration of particle conditioning unit and a first stage collector in which the particle conditioning unit is used as a polarizer.
Figure 10A:
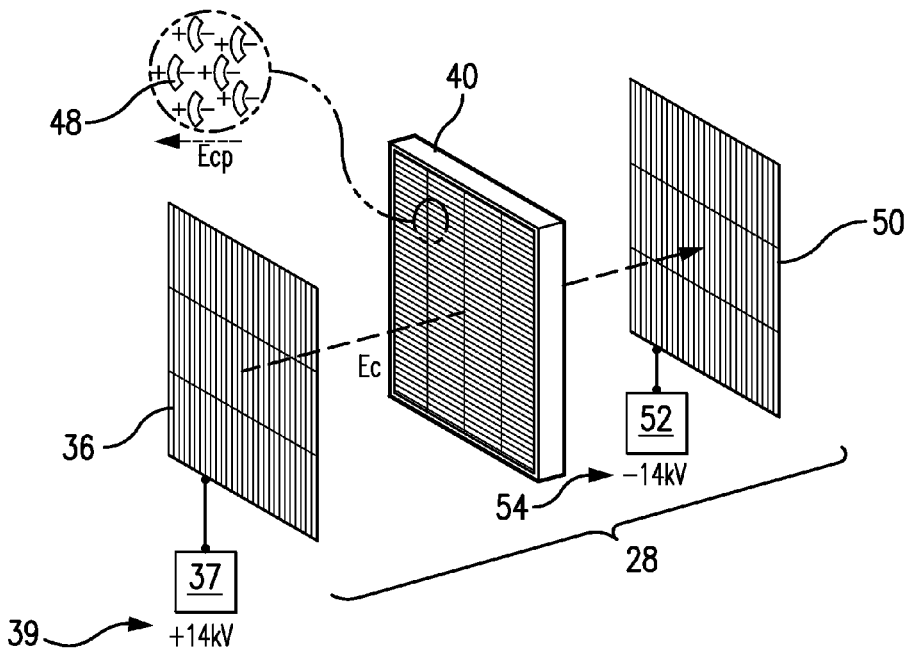
FIG. 10A is a diagrammatical illustration of an electric field established by the first stage collector.
Figure 10B:
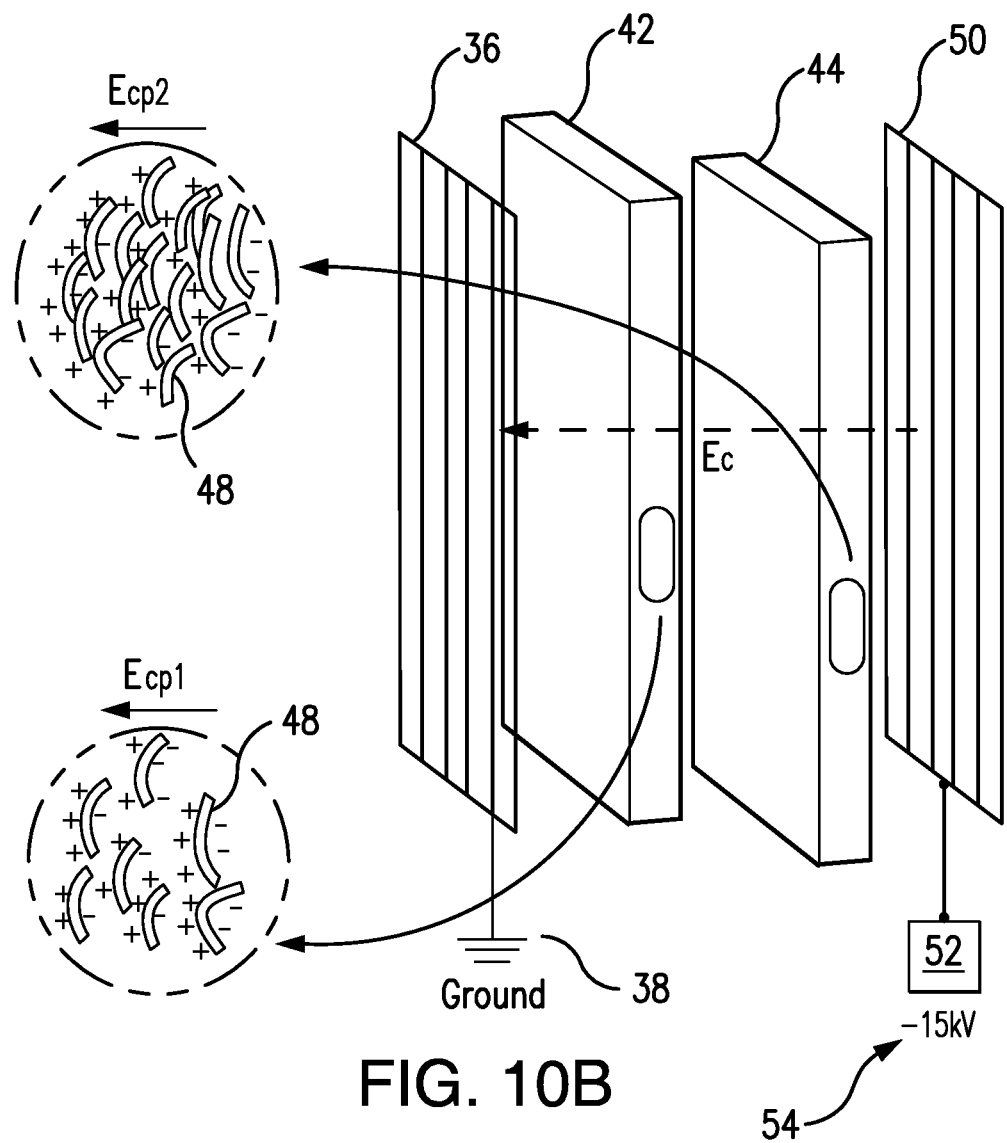
FIG. 10B is another diagrammatical illustration of an electric field established by the first stage collector.

In yet another embodiment of the present disclosure and with reference to 9A, 9B, 10A and 10B, the particle conditioning unit 16 is at a potential of −15 kV. However, the electrically conductive elements 20, or wires, have a larger diameter (large gauge) and do not create an ion field. The particle conditioning unit 16 creates a negative plane field at the grid assembly (see FIG. 9). The second grid 36 of the first stage collector 28 is grounded and the third grid 50 is at −15 kV. The particle collider 56 utilized is the serrated blade configuration comprising a plurality of serrated blades 58. The second stage collector 70 has the fourth grid 74 grounded and the fifth grid 82 at +15 kV to provide the opposite collection ability as the first stage collector 28. As particles 12 enter the particle conditioning unit 16 they are forced to polarize due to the strong plane field set up by the −15 kV field. The dipoles formed move toward the first particle diffuser 32 of the first stage collector 28. Since the first particle diffuser 32 is at the same potential as the dipoles the dipoles deflect away from the grounded second grid 36 in the first stage collector 28. FIG. 10 shows the set-up of the E fields in the first collector pad assembly 40 of the first stage collector 28. As can be seen, the fields set up in the first collector pad assembly 40 are at opposite potential to the incoming dipoles and therefore have a strong attraction to them. By optimizing the thickness of the first diffuser pad 32 and first collector pad assembly 40, and by optimizing the distances of the particle conditioning unit 16 and second and third grids 36, 50 of the first stage collector 28, particles penetrate the first collector pad assembly 40 of the first stage collector 28. The incoming velocity of the particles, the strength of the dipole moment of the particles after leaving the particle conditioning unit 16 (amount of charge on each end of the dipole and its ability to keep the charge distribution), and the mass of the particles dictate the penetration of particles into the first stage collector 28. Both the particle collider 56 and second stage collector 70 behave as described above. However the second stage collector 70 has the opposite potential applied for efficient collection. It should be noted that the particle conditioning unit 16 could have different diameter electrically conductive elements 20, or wires, employed to both polarize and ionize incoming particles for the most efficient collection of incoming airborne particles 12 in the system 10 (see FIG. 2B). Also, the applied potentials can be changed on the particle conditioning unit 16 and second, third, fourth, and fifth collector assembly grids 36, 50, 74, 82 to optimize particle collection and deactivation efficiency without changing the scope of the apparatus. It should also be noted that the component positions in the system 10 could be changed without changing the scope of the apparatus.

Figure 11A:
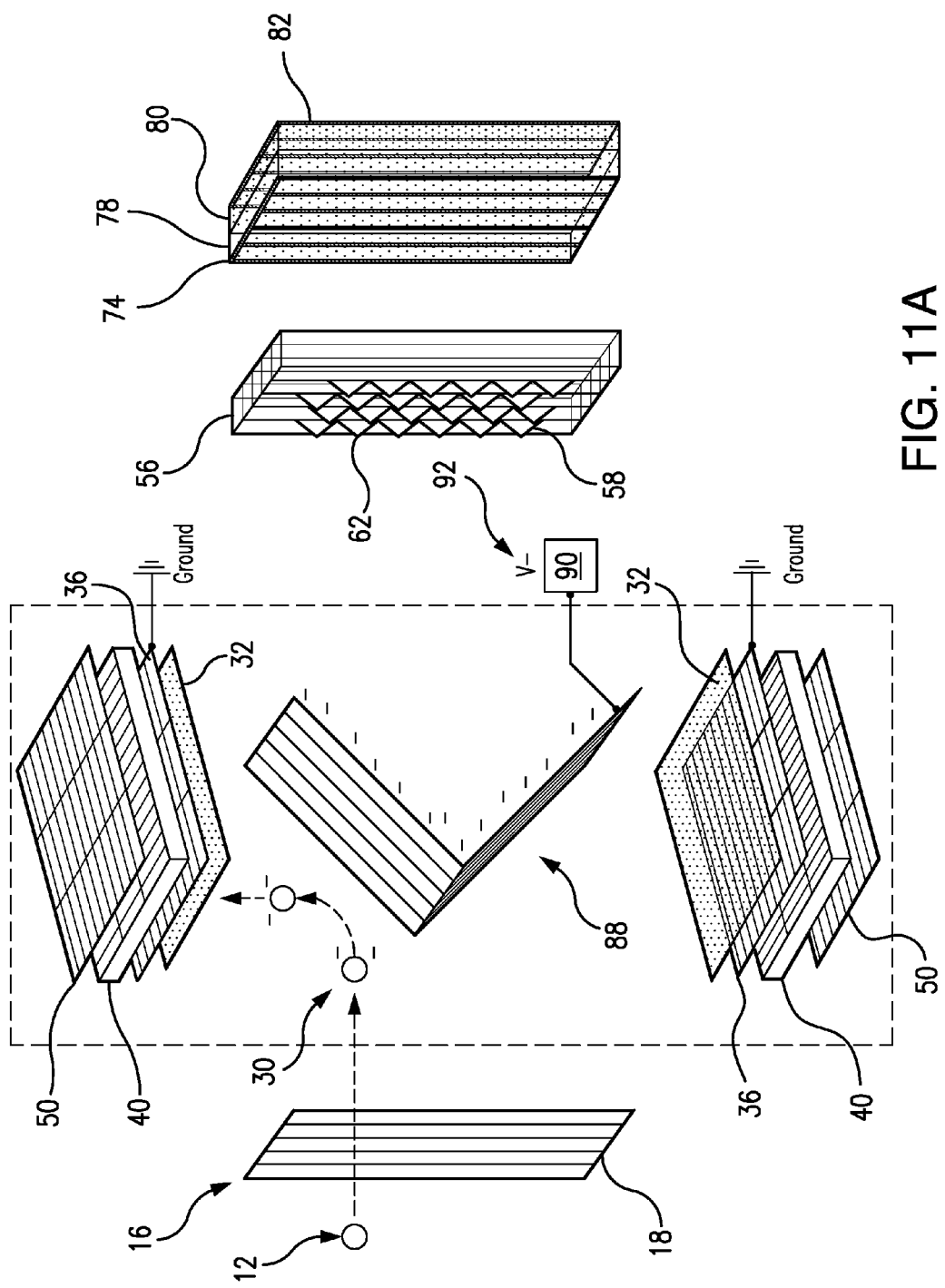
FIG. 11A is a diagrammatical illustration of an air filtration system utilizing a No Pressure Drop Collector configuration.
Figure 11B:
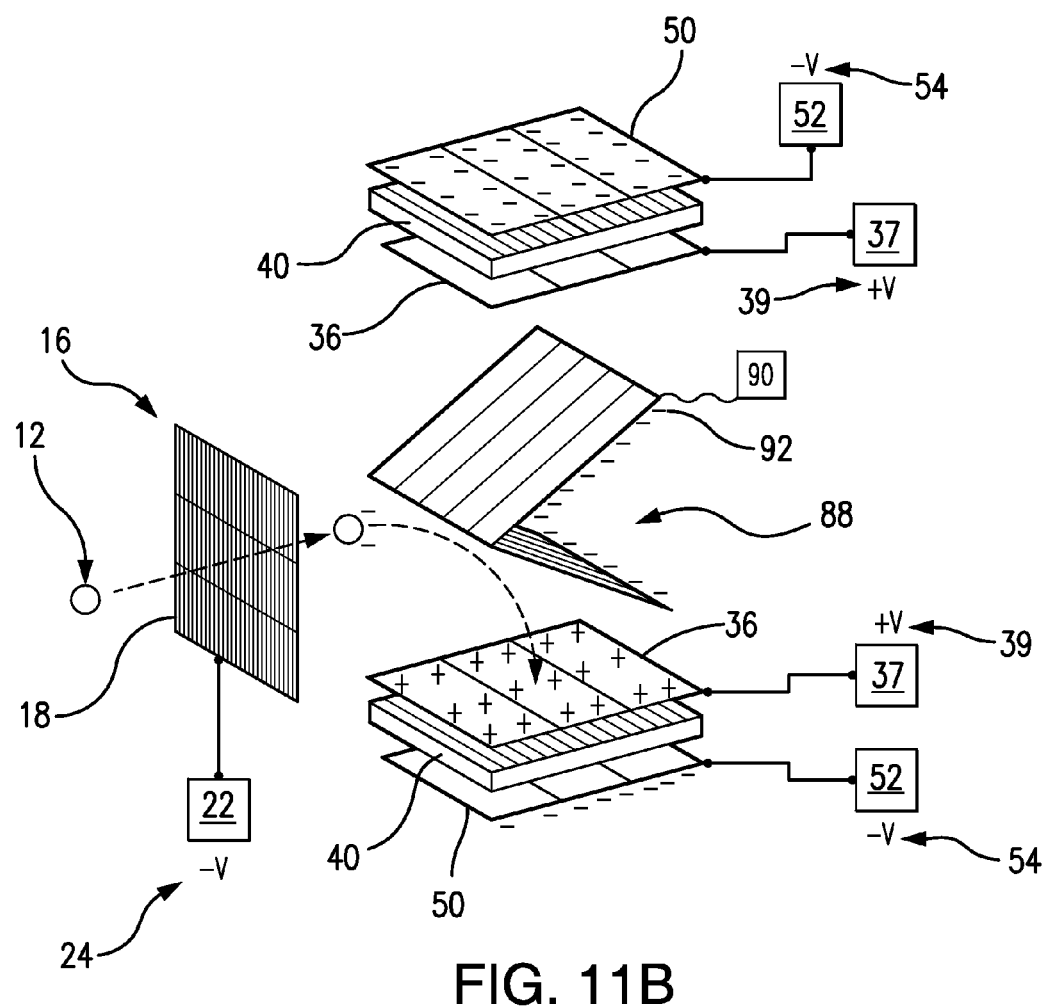
FIG. 11B is another diagrammatical illustration of an air filtration system utilizing a No Pressure Drop Collector configuration.

Yet another embodiment of the present disclosure employs a No Pressure Drop Collector System. The particle conditioning unit 16 is set to −15 kV and a Particle Deflector 88 is set to 15 kV. The wires in the particle conditioning unit 16 have a small diameter and creates an ion field. The particle conditioning unit 16 creates negative ions out of incoming particles (see FIG. 11A, 11B). The first stage collector 28 is placed parallel at the top and bottom of the ACS and is set up to attract and capture particles, as shown. Note by adjusting the fields in the particle conditioning unit 16 and Particle Deflector 88 the particle conditioning unit 16 can be utilized as a polarizer. The first stage collector 28 is set up as shown in FIG. 8 as it is with other embodiments. The Particle Collider 56 utilized is the serrated blade configuration. The second stage collector 70 has the fourth grid 74 grounded and the fifth grid 82 at −15 kV to provide the opposite collection ability as the first stage collector 28. It should be noted that the second stage collector 70 could also be a No Pressure Drop Collector System. As particles 12 enter the particle conditioning unit 16 they are negatively charged. The charged particles 30 move toward the Particle Deflector 88 and get deflected towards the first stage collector 28, as seen in the FIG. 11. Since, the first stage collector 28 is identical in structure as other embodiments, except it is placed parallel to the airstream, it performs the same way as other embodiments. Particles that escape the first stage collector 28 will enter the Particle Collider 56. As explained above, this section causes particles to inelastically collide with each other forming larger particles 68. The particles that leave the Particle Collider 56 are larger and more neutral in charge. The second stage collector 70 collects any remaining charged particles not captured by the first stage collector 28 and that pass through the Particle Collider 56 with a charge associated with it (inefficient collisions). The remaining particles that do escape the second stage collector 70 are conditioned by the Particle Collider 56 to clean out the occupied space 14. Since these conditioned particles are larger in size and more neutral in charge they are controlled by airflow. They will return to the pre-filter and ACS to be collected. It is understood by those familiar with the art that other potentials, including the opposite potential or grounding can be applied to the components of the ACS and still be within the scope of the apparatus. It should be noted that the particle conditioning unit 16 could have different diameter wires employed to both polarize and ionize incoming particles for the most efficient collection of incoming particles in the ACS (see FIG. 2B). Also, the applied potentials can be changed on the particle conditioning unit 16 and collector assembly grids 36, 50, 74, 82 to optimize particle collection and deactivation efficiency without changing the scope of the apparatus. It should also be noted that the component positions in the ACS could be changed without changing the scope of the apparatus. It should also be noticed that the first and/or second stage collectors 28, 70 can be a No Pressure Drop Collector System.

Figure 7A:
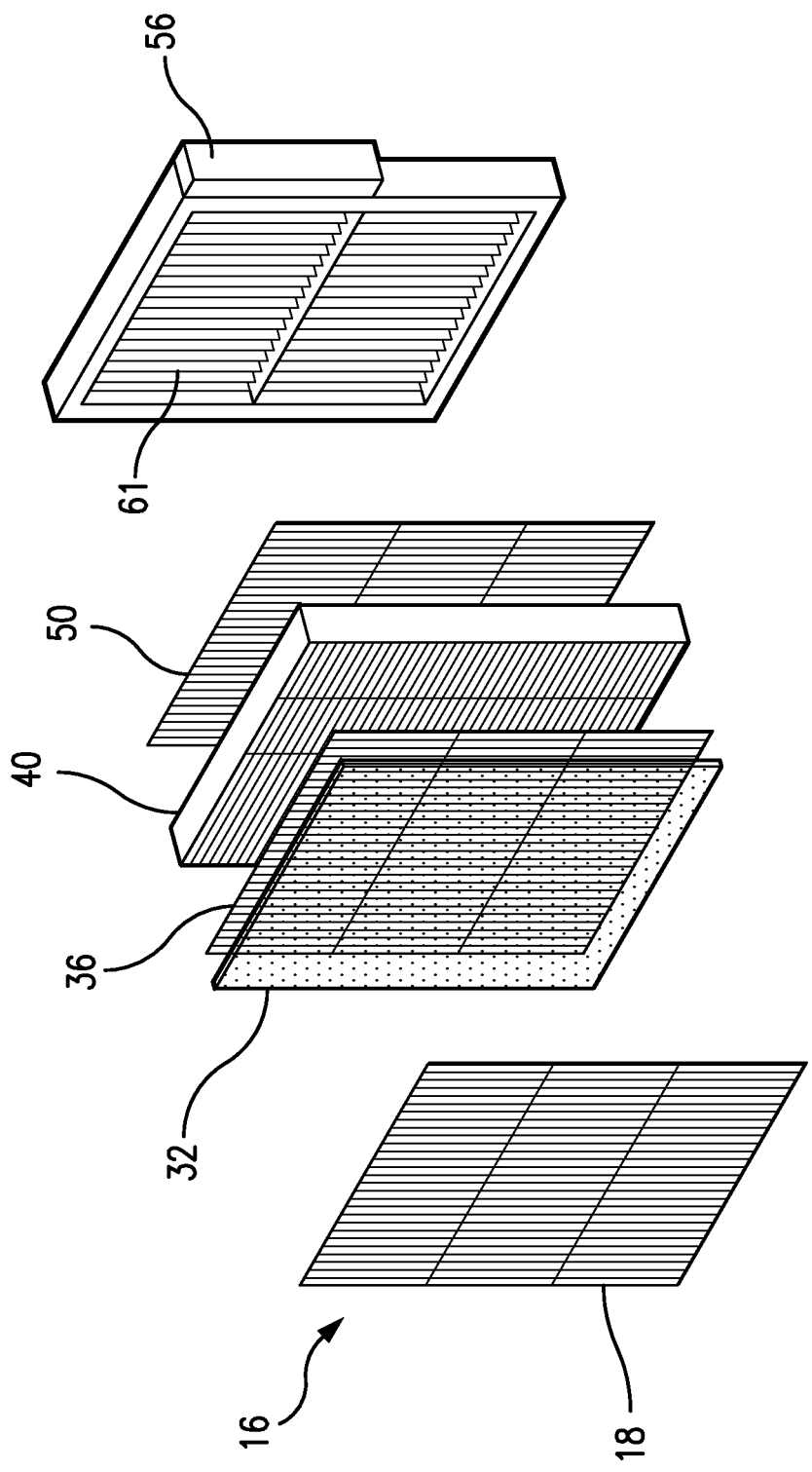
FIG. 7A is a diagrammatical illustration of an air filtration system comprising a particle conditioning unit, a first stage collector, and a particle collider.
Figure 7B:
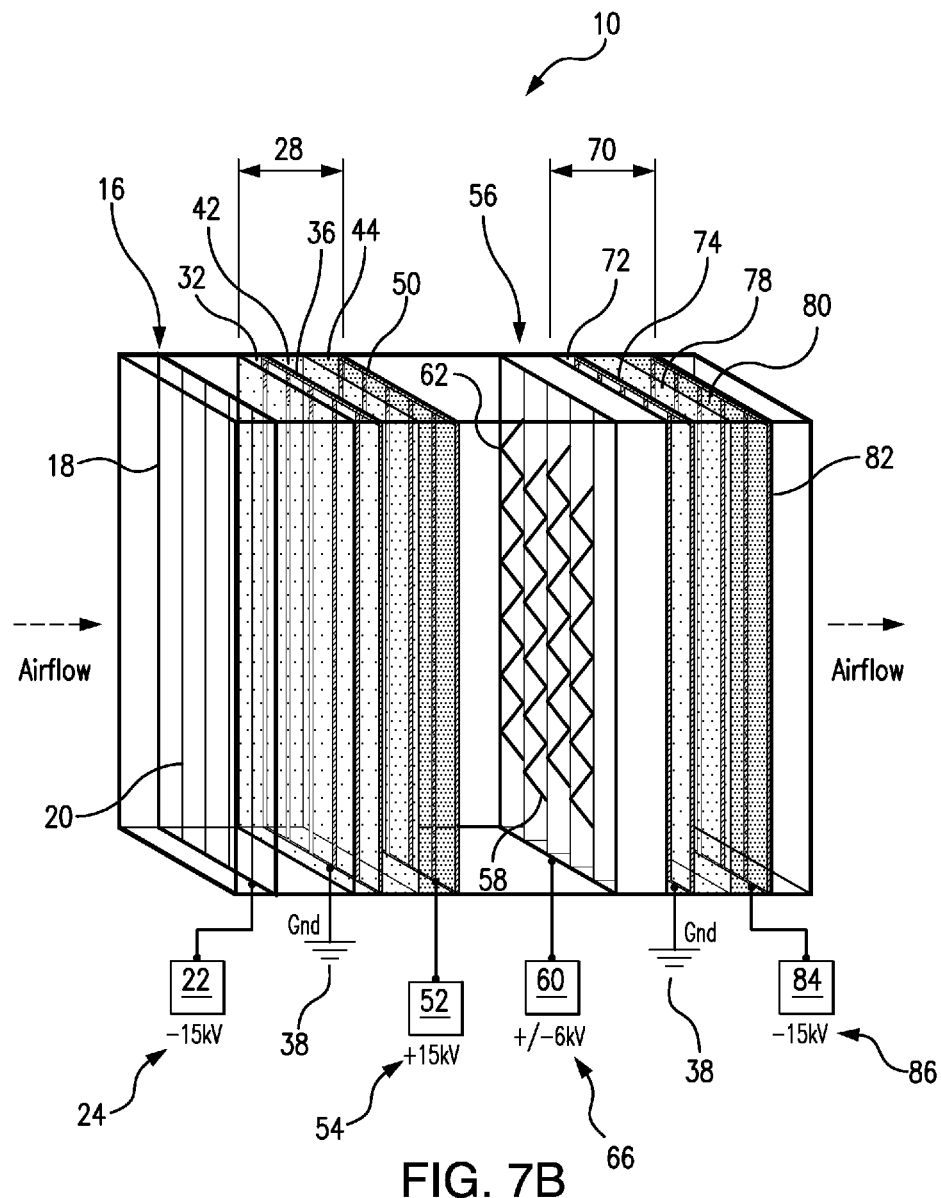
FIG. 7B is a diagrammatical illustration of an air filtration system comprising a particle conditioning unit, a first stage collector, a particle collider, and a second stage collector.
Figure 7C:
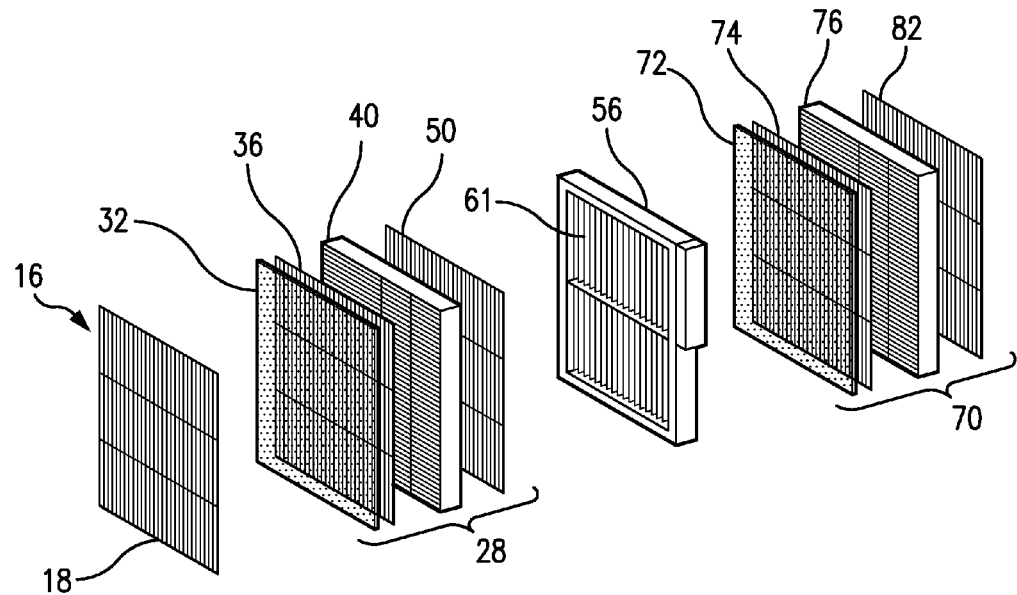
FIG. 7C is another diagrammatical illustration of an air filtration system comprising a particle conditioning unit, a first stage collector, a particle collider, and a second stage collector.
Figure 8A:
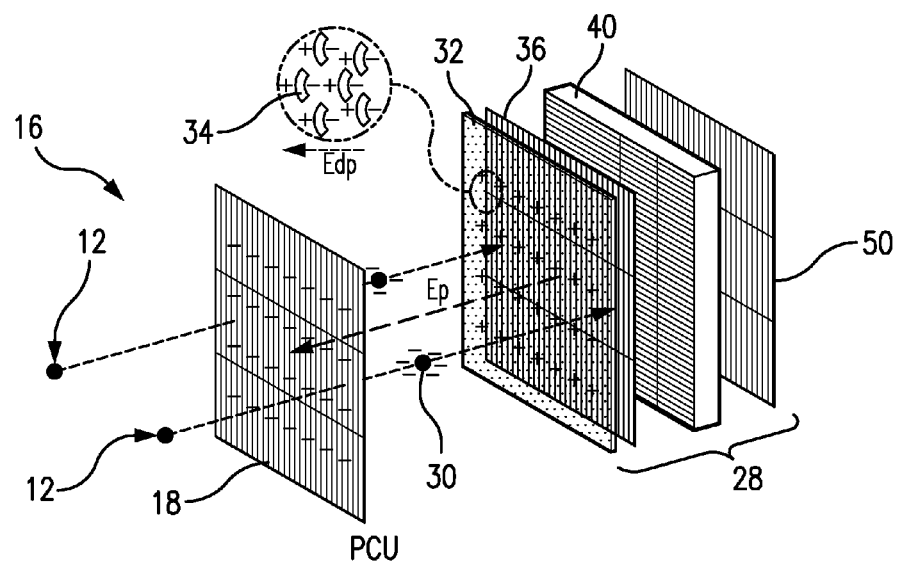
FIG. 8A is a diagrammatical illustration of a negative ion field created by a particle conditioning unit.
Figure 8B:
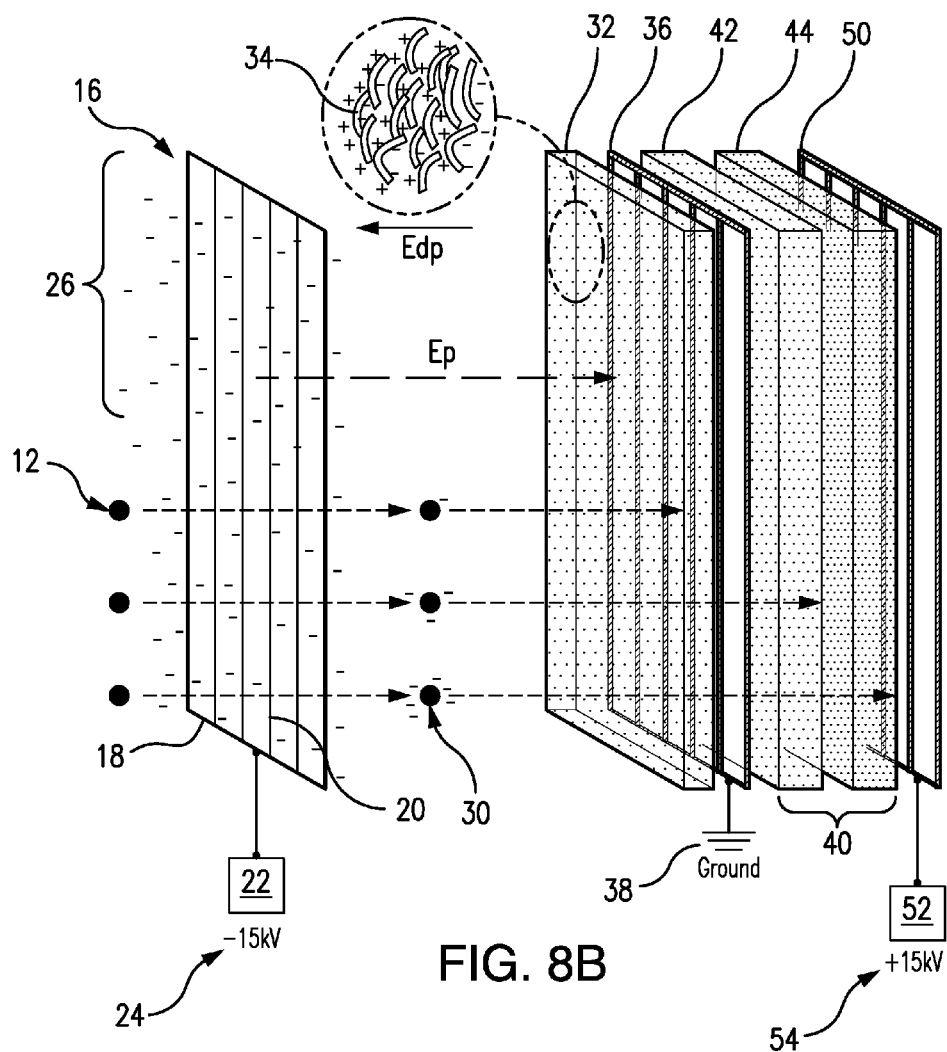
FIG. 8B is another diagrammatical illustration of a negative ion field created by a particle conditioning unit.

Yet another embodiment of the present disclosure, the particle conditioning unit 16 is at a potential of −14 kV. The second grid 36 of the first stage collector 28 is +14 kV and the third grid 50 is at −14 kV. If a second stage collector 70 is utilized it has the opposite polarities in the second grid 36 and the third grid 50, which sets up opposite fields of the first stage collector 28 (FIGS. 7A and 7B). The wires employed in the particle conditioning unit 16 are small gauge and therefore a negative ion field, or corona field 26, is generated (FIG. 8). The second grid 36 of the first stage collector 28 is positive, creating an electric field Ep between the particle conditioning unit 16 and the second grid 36 of the first stage collector 28, through the first particle diffuser 32 (if utilized). Three things dictate the penetration of particles into the PCU: the incoming velocity of the particle, the amount of charge on the particle after leaving the particle conditioning unit 16, and the mass of the particle. By taking advantage of these properties a large surface area is made out of a relatively small depth of collector material. Particles that escape the first stage collector 28 will enter the particle collider 56. As explained above, this section causes particles to inelastically collide with each other forming larger particles 68. The particles that leave the Particle Collider 56 are larger and more neutral in charge. It is understood by those familiar with the art that other potentials, including the opposite potential or grounding can be applied to the components of the ACS and still be within the scope of the apparatus. More than one collector can be utilized and the materials used in the collector can be changed, or increased in number without changing the scope of apparatus.

In yet another embodiment of the present disclosure the particle conditioning unit 16 is at a potential of −14 kV. However, the electrically conductive elements 20, or wires, have a larger diameter (large gauge) and does not create an ion field. The particle conditioning unit 16 creates a negative plane field at the first grid 18 assembly (see FIG. 9). The second grid 36 of the first stage collector 28 is +14 kV and the third grid 50 is at −14 kV. If a second stage collector 70 is installed the second stage collector 70 has the fourth grid 74 grounded and the fifth grid 82 at +14 kV to provide the opposite collection ability as the first stage collector 28 (similar to FIG. 7B, employing polarizing particle conditioning units instead of ionizing particle conditioning units). As airborne particles 12 enter the particle conditioning unit 16 they are forced to polarize due to the strong plane field set up by the −14 kV field. The dipoles formed move toward the first stage collector 28. FIG. 10 shows the set-up of the E fields in the first collector pad assembly 40 by the particle conditioning unit 16. As can be seen, the fields set up in the first collector pad assembly 40 are at opposite potential to the incoming dipoles and therefore have a strong attraction to them. By optimizing the thickness of the collector pad assemblies 40, 76, and by optimizing the distances of the particle conditioning unit 16 and grids of the first stage collector 28, particles penetrate the first collector pad assembly 40 of the first stage collector 28. The incoming velocity of particle, the strength of the dipole moment of the particle after leaving the particle conditioning unit 16 (amount of charge on each end of the dipole and its ability to keep the charge distribution), and the mass of the particle dictate the penetration of particles into the first stage collector 28. It should be noted that the particle conditioning unit 16 could have different diameter wires employed to both polarize and ionize incoming particles for the most efficient collection of incoming airborne particles 12 in the system 10 (see FIG. 2B). Also, the applied potentials can be changed on the particle conditioning unit 16 and collector assembly grids 36, 50, 74, 82 to optimize particle collection and deactivation efficiency without changing the scope of the apparatus. It should also be noted that the component positions in the system 10 could be changed without changing the scope of the apparatus. In other words the particle collider 56 can be placed between two stages of collectors 28, 70 and not affect the scope of the apparatus.

In yet another embodiment of the present disclosure, a No Pressure Drop Collector System is employed. The particle conditioning unit 16 is set to −14 kV and the particle deflector 88 is set to −14 kV. The electrically conductive elements 20, or wires, in the particle conditioning unit 16 have a small diameter and create an ion field or corona field 26. The particle conditioning unit 16 creates negative ions out of incoming particles 12 (see FIG. 11). The first stage collectors 28 are placed parallel at the top and bottom of the system 10 and are set up to attract and capture particles, as shown. Note by adjusting the fields in the particle conditioning unit 16 and particle deflector 88, the particle conditioning unit 16 can be utilized as a polarizer. The particle conditioning unit 16 is set up as shown in FIG. 8. As particles 12 enter the particle conditioning unit 16 they are negatively charged. The charged particles 30 move toward the particle deflector 88 and are deflected towards the upper or lower first stage collectors 28. Since, the first stage collector 28 is identical in structure as the embodiments above, except it is placed parallel to the airstream, it performs the same way as in the above embodiments. Particles that escape the first stage collector 28 will enter the particle collider 56, this section causes particles to inelastically collide with each other forming larger particles 68. The particles that leave the particle collider 56 are larger particles 68 and more neutral in charge. It is understood by those familiar with the art that other potentials, including the opposite potential or grounding can be applied to the components of the system 10 and still be within the scope of the apparatus. It should be also noted that the particle conditioning unit 16 could have different diameter wires employed to both polarize and ionize incoming particles for the most efficient collection of incoming particles in the system 10 (see FIG. 2B). The applied potentials can be changed on the particle conditioning unit 16 and collector assembly grids 36, 50, 74, 82 to optimize particle collection and deactivation efficiency without changing the scope of the apparatus. The component positions in the system 10 could be changed without changing the scope of the apparatus. The first and/or second stage collectors 28, 70 could be a No Pressure Drop Collector System with the other being a conventional type collector without changing the scope of the apparatus.

In yet another embodiment of the invention, the system 10 for filtering airborne particles 12 in an occupied space 14 further comprises a particle deflector 88 and a fifth voltage source 90, the particle deflector 88 positioned downstream the particle conditioning unit 16, wherein a fifth voltage 92 is applied to the particle deflector 88 by the fifth voltage source 90 sufficient for redirecting particles received from the particle conditioning unit 16 to at least one of the first stage collector 28 and second stage collector 70.

In yet another embodiment of the present invention, the system 10 for filtering airborne particles 12 in an occupied space 14, the first stage collector 28 and the second stage collector 70 are positioned perpendicular to the particle conditioning unit 16.

When dielectric impregnated media material 48 is placed in an electrostatic field the media material 48 is polarized setting up an opposite electric field from the original field. The material becomes a deflector to incoming particles. The objective is to protect a grid system attached to it from coating with incoming particles.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for filtering airborne particles in an occupied space, the system comprising:
a particle conditioning unit including a first grid of electrically conductive elements and a first voltage source, wherein a first voltage is applied to the first grid by the first voltage source sufficient for creating a corona field for ionizing airborne particles received by the particle conditioning unit;
a first stage collector positioned downstream the particle conditioning unit for receiving the ionized airborne particles, the first stage collector including a first particle diffuser including dielectric fibers; and
a particle collider.

2. The system for filtering airborne particles in an occupied space according to claim 1, wherein the electrically conductive elements include electrically conductive wires sufficient for creating a corona field for ionizing airborne particles received by the particle conditioning unit upon application of the first voltage to the first grid by the first voltage source.

3. The system for filtering airborne particles in an occupied space according to claim 1, wherein the electrically conductive elements include electrically conductive wires sufficient for creating an electrostatic field for polarizing airborne particles received by the particle conditioning unit upon application of the first voltage to the first grid by the first voltage source.

4. The system for filtering airborne particles in an occupied space according to claim 1, wherein the first voltage is of negative polarity.

5. The system for filtering airborne particles in an occupied space according to claim 1, the first stage collector further comprising a second grid positioned downstream the first particle diffuser.

6. The system for filtering airborne particles in an occupied space according to claim 5, the second grid including electrically conductive elements, wherein the second grid is electrically grounded.

7. The system for filtering airborne particles in an occupied space according to claim 5, the second grid including electrically conductive elements and a first supplemental voltage source, wherein a first supplemental voltage is applied to the second grid by the first supplemental voltage source, and wherein the first supplemental voltage is of opposite polarity to the first voltage.

8. The system for filtering airborne particles in an occupied space according to claim 6, the first stage collector comprising a first collector pad assembly positioned downstream the second grid.

9. The system for filtering airborne particles in an occupied space according to claim 8, the first collector pad assembly including a first filter pad and a second filter pad.

10. The system for filtering airborne particles in an occupied space according to claim 9, wherein the first and second filter pads comprise fibers of dielectric material.

11. The system for filtering airborne particles in an occupied space according to claim 10, wherein the first filter pad is less dense than the second filter pad.

12. The system for filtering airborne particles in an occupied space according to claim 11, the first stage collector comprising a third grid positioned downstream the first collector pad assembly.

13. The system for filtering airborne particles in an occupied space according to claim 12, the third grid including electrically conductive elements and a second voltage source, wherein a second voltage is applied to the third grid by the second voltage source, and wherein the second voltage is of opposite polarity to the first voltage.

14. The system for filtering airborne particles in an occupied space according to claim 12, the third grid including electrically conductive elements and a second voltage source, wherein a second voltage is applied to the third grid by the second voltage source, and wherein the second voltage is of a same polarity to the first voltage.

15. The system for filtering airborne particles in an occupied space according to claim 1, wherein the particle collider is positioned downstream the first stage collector.

16. The system for filtering airborne particles in an occupied space according to claim 15, the particle collider including at least one of the group consisting of a plurality of parallel serrated blades, a plurality of parallel solid blades, and a wire array, the particle collider further comprising a third voltage source.

17. The system for filtering airborne particles in an occupied space according to claim 16, the particle collider sufficient for emitting ionizing particles, wherein a third voltage is applied to the particle collider by the third voltage source, and wherein the third voltage continuously alternates in polarity, the third voltage sufficient for creating a switching electrodynamic field for forcing the airborne particles to collide with one another, thereby forming larger particles.

18. The system for filtering airborne particles in an occupied space according to claim 1, the system further comprising a second stage collector.

19. The system for filtering airborne particles in an occupied space according to claim 18, wherein the second stage collector is positioned downstream the particle collider for receiving particles from the particle collider.

20. The system for filtering airborne particles in an occupied space according to claim 19, the second stage collector comprising a second particle diffuser including dielectric fibers.

21. The system for filtering airborne particles in an occupied space according to claim 20, the second stage collector further comprising a fourth grid positioned downstream the second particle diffuser.

22. The system for filtering airborne particles in an occupied space according to claim 21, the fourth grid including electrically conductive elements, wherein the fourth grid is electrically grounded.

23. The system for filtering airborne particles in an occupied space according to claim 21, the fourth grid including electrically conductive elements and a second supplemental voltage source, wherein a second supplemental voltage is applied to the fourth grid by the second supplemental voltage source, and wherein the second supplemental voltage is of a same polarity to the first voltage.

24. The system for filtering airborne particles in an occupied space according to claim 22, the second stage collector comprising a second collector pad assembly positioned downstream the fourth grid.

25. The system for filtering airborne particles in an occupied space according to claim 24, the second collector pad assembly including a third filter pad and a fourth filter pad.

26. The system for filtering airborne particles in an occupied space according to claim 25, wherein the third and fourth filter pads comprise fibers of dielectric material.

27. The system for filtering airborne particles in an occupied space according to claim 26, wherein the third filter pad is less dense than the fourth filter pad.

28. The system for filtering airborne particles in an occupied space according to claim 27, the second stage collector comprising a fifth grid positioned downstream the second collector pad assembly.

29. The system for filtering airborne particles in an occupied space according to claim 28, the fifth grid including electrically conductive elements and a fourth voltage source, wherein a fourth voltage is applied to the fifth grid by the fourth voltage source, and wherein the fourth voltage is of a same polarity of the first voltage.

30. The system for filtering airborne particles in an occupied space according to claim 28, the fifth grid including electrically conductive elements and a fourth voltage source, wherein a fourth voltage is applied to the fifth grid by the fourth voltage source, and wherein the fourth voltage is of opposite polarity of the first voltage.

31. The system for filtering airborne particles in an occupied space according to claim 18, further comprising a particle deflector and a fifth voltage source, the particle deflector positioned downstream the particle conditioning unit, wherein a fifth voltage is applied to the particle deflector by the fifth voltage source sufficient for redirecting particles received from the particle conditioning unit to at least one of the first stage collector and second stage collector.

32. The system for filtering airborne particles in an occupied space according to claim 31, wherein the first stage collector and the second stage collector are positioned perpendicular to the particle conditioning unit.

33. The system for filtering airborne particles in an occupied space according to claim 2, wherein the corona field is used to kill pathogens.

34. The system for filtering airborne particles in an occupied space according to claim 3, wherein the electrostatic field is used to kill pathogens.

* * * * *